(12) United States Patent
Hattori et al.

(10) Patent No.: US 6,868,446 B2
(45) Date of Patent: Mar. 15, 2005

(54) DATA PROCESSING APPARATUS AND NETWORK SYSTEM THAT OUTPUTS QUALITY OF SERVICE INFORMATION TO A USER

(75) Inventors: Ryuichi Hattori, Yokohama (JP); Toshihiko Ogura, Ebina (JP); Takashi Oeda, Yokohama (JP); Koichi Okazawa, Ebina (JP); Hideki Osaka, Hiratsuka (JP); Tsunehiro Tobita, Yokohama (JP); Tsutomu Hara, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/336,796

(22) Filed: Jan. 6, 2003

(65) Prior Publication Data

US 2003/0135614 A1 Jul. 17, 2003

Related U.S. Application Data

(60) Continuation of application No. 10/082,185, filed on Feb. 26, 2002, now Pat. No. 6,519,640, which is a continuation of application No. 09/518,147, filed on Mar. 3, 2000, now Pat. No. 6,370,577, which is a division of application No. 09/106,291, filed on Jun. 29, 1998, now Pat. No. 6,094,674, which is a division of application No. 08/434,291, filed on May 3, 1995, now Pat. No. 5,774,656.

(30) Foreign Application Priority Data

May 6, 1994 (JP) .............................................. 6-094431

(51) Int. Cl.[7] ................................................ G06F 11/32
(52) U.S. Cl. ........................ 709/224; 709/231; 709/216; 709/218; 709/223; 709/228
(58) Field of Search ................................. 709/200, 203, 709/212, 213, 214, 216, 217, 218, 220, 223, 224, 226, 228; 711/147, 148

(56) References Cited

U.S. PATENT DOCUMENTS

| 5,313,646 | A | | 5/1994 | Hendricks et al. .......... 707/101 |
| 5,349,674 | A | | 9/1994 | Calvert et al. |
| 5,459,307 | A | | 10/1995 | Klotz, Jr. |
| 5,515,363 | A | | 5/1996 | Ben-Nun et al. |
| 5,548,726 | A | | 8/1996 | Pettus |
| 5,581,784 | A | * | 12/1996 | Tobagi et al. .................. 710/6 |
| 5,594,921 | A | | 1/1997 | Pettus |
| 5,678,042 | A | * | 10/1997 | Pisello et al. ................. 714/47 |
| 5,751,709 | A | | 5/1998 | Rathnavelu |
| 5,812,748 | A | * | 9/1998 | Ohran et al. ................... 714/4 |
| 5,822,586 | A | | 10/1998 | Strutt et al. |
| 5,893,086 | A | * | 4/1999 | Schmuck et al. .............. 707/1 |

FOREIGN PATENT DOCUMENTS

| JP | 6276254 | 9/1994 |
| JP | 695321 | 11/1994 |

OTHER PUBLICATIONS

A Technology of OSF@, Soft Research Center, Inc., Aug. 25, 1992.

* cited by examiner

Primary Examiner—B. James Peikari
(74) Attorney, Agent, or Firm—Antonelli, Terry, Stout & Kraus, LLP

(57) ABSTRACT

In each of the information processing apparatuses connected to each other via a network, there is arranged a quality of service (QOS) table to which functions and performance thereof are registered. When an information processing apparatus is additionally linked with the network, a QOS table thereof is automatically registered to a local directory of the network such that an agent converts the contents of the QOS table into service information to be supplied via a user interface to the user. Thanks to the operation, information of functions and performance of each information processing apparatus connected to the network is converted into service information for the user. Consequently, the user can much more directly receive necessary services.

11 Claims, 24 Drawing Sheets

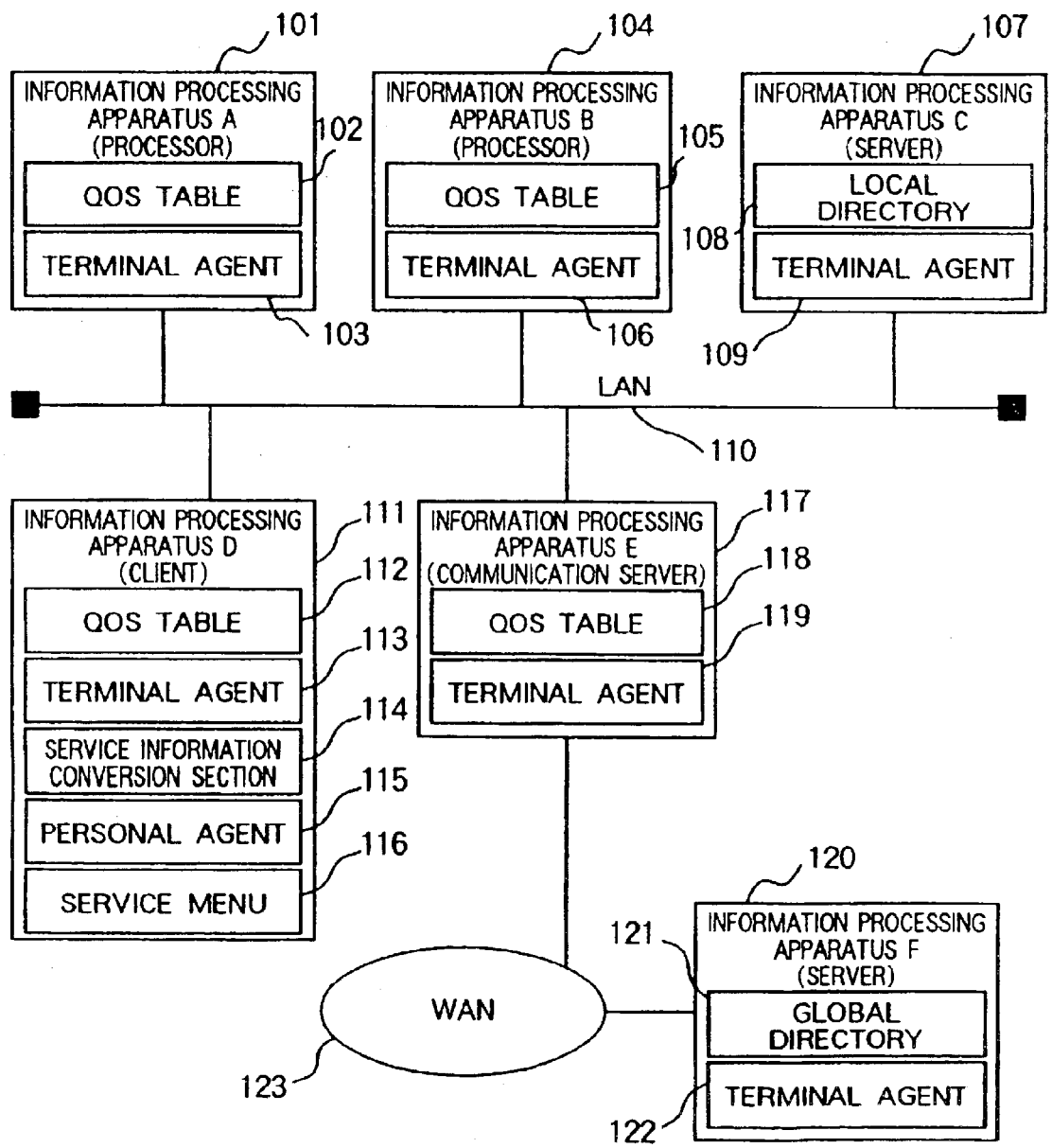

FIG.2

QOS TABLE REGISTRATION SECTION (301)

| # | REGISTRATION ITEM | REGISTRATION CONTENTS (FUNCTION, PERFORMANCE) |
|---|---|---|
| 1 | KIND OF INFORMATION PROCESSING APPARATUS | COMPUTING SERVER |
| 2 | BINARY TYPE | 86-MODEL CPU COMPATIBLE |
| 3 | MIPS VALUE OF PROCESSOR | MIPS VALUE |
| 4 | BENCHMARK VALUE | BENCHMARK EXECUTION RESULT |
| 5 | COST PER UNITARY TIME | COST INFORMATION |
| ⋮ | ⋮ (302) | ⋮ (303) |

NETWORK ADDRESS REGISTRATION SECTION (304)

| # | CONNECTED RESOURCE NAME | ADDRESS ON NETWORK |
|---|---|---|
| 1 | COMPUTING SERVER A | NETWORK IP ADDRESS A |
| 2 | COMPUTING SERVER B | NETWORK IP ADDRESS B |
| 3 | COMPUTING SERVER C | NETWORK IP ADDRESS C |
| 4 | COMPUTING SERVER D | NETWORK IP ADDRESS D |
| 5 | COMPUTING SERVER E | NETWORK IP ADDRESS E |
| ⋮ | ⋮ (305) | ⋮ (306) |

FIG.3

GENERAL SERVICE CONVERSION TABLE (PROCESSING PERFORMANCE) — 307

| 1 | MIPS VALUE OF PROCESSOR A | PROCESSING PERFORMANCE /COST INFORMATION A |
|---|---|---|
| 2 | MIPS VALUE OF PROCESSOR B | PROCESSING PERFORMANCE /COST INFORMATION B |
| 3 | MIPS VALUE OF PROCESSOR C | PROCESSING PERFORMANCE /COST INFORMATION C |
| 4 | MIPS VALUE OF PROCESSOR D | PROCESSING PERFORMANCE /COST INFORMATION D |
| 5 | MIPS VALUE OF PROCESSOR E | PROCESSING PERFORMANCE /COST INFORMATION E |
| 6 | MIPS VALUE OF PROCESSOR F | PROCESSING PERFORMANCE /COST INFORMATION F |
| ⋮ | ⋮ 308 | ⋮ 309 |

PERSONAL SERVICE CONVERSION TABLE (MENU DISPLAY ORDER) — 310

| 1 | USAGE FREQENCY OF SERVICE A | NOT DISPLAYED |
|---|---|---|
| 2 | USAGE FREQENCY OF SERVICE B | 1ST ITEM OF MENU |
| 3 | USAGE FREQENCY OF SERVICE C | 3RD ITEM OF MENU |
| 4 | USAGE FREQENCY OF SERVICE D | 2ND ITEM OF MENU |
| 5 | USAGE FREQENCY OF SERVICE E | NOT DISPLAYED |
| 6 | USAGE FREQENCY OF SERVICE F | NOT DISPLAYED |
| ⋮ | ⋮ 311 | ⋮ 312 |

FIG.5

LOCAL DIRECTORY REGISTRATION SECTION — 313

| # | LOCAL DIRECTORY NAME | GATEWAY ADDRESS |
|---|---|---|
| 1 | LOCAL DIRECTORY A | GATEWAY IP ADDRESS A |
| 2 | LOCAL DIRECTORY B | GATEWAY IP ADDRESS B |
| 3 | LOCAL DIRECTORY C | GATEWAY IP ADDRESS C |
| 4 | LOCAL DIRECTORY D | GATEWAY IP ADDRESS D |
| 5 | LOCAL DIRECTORY E | GATEWAY IP ADDRESS E |
| ⋮ | ⋮ 314 | ⋮ 315 |

RESOURCE REGISTRATION SECTION — 316

| # | RESOURCE TYPE | CONNECTION DIRECTORY |
|---|---|---|
| 1 | COMPUTING RESOURCE A | DIRECTORY A |
| 2 | COMPUTING RESOURCE A | DIRECTORY B |
| 3 | COMPUTING RESOURCE A | DIRECTORY C |
| 4 | COMPUTING RESOURCE A | DIRECTORY A |
| 5 | COMPUTING RESOURCE A | DIRECTORY A |
| ⋮ | ⋮ 317 | ⋮ 318 |

FIG. 7

GENERAL SERVICE CONVERSION TABLE (PROCESSING PRECISION) — 319

| | | |
|---|---|---|
| 1 | NO. OF EFFECTIVE FIGURES OF PROCESSOR A | EQUIVALENT TO ELECTRONIC CALCULATOR |
| 2 | NO. OF EFFECTIVE FIGURES OF PROCESSOR B | EQUIVALENT TO HOUSEKEEPING BOOK |
| 3 | NO. OF EFFECTIVE FIGURES OF PROCESSOR C | APPLICABLE TO HYDRODYNAMICS |
| 4 | NO. OF EFFECTIVE FIGURES OF PROCESSOR D | APPLICABLE TO ASTRONOMY |
| 5 | NO. OF EFFECTIVE FIGURES OF PROCESSOR E | CONFORMING TO JIS |
| 6 | NO. OF EFFECTIVE FIGURES OF PROCESSOR F | GENERAL CALCULATION |
| ⋮ | ⋮ 320 | ⋮ 110 |

PERSONAL SERVICE CONVERSION TABLE (PROCESSING PRECISION) — 324

| | | |
|---|---|---|
| 1 | NO. OF EFFECTIVE FIGURES OF PROCESSOR A | BENCHMARK EXECUTION RESULT A |
| 2 | NO. OF EFFECTIVE FIGURES OF PROCESSOR B | BENCHMARK EXECUTION RESULT A |
| 3 | NO. OF EFFECTIVE FIGURES OF PROCESSOR C | BENCHMARK EXECUTION RESULT A |
| 4 | NO. OF EFFECTIVE FIGURES OF PROCESSOR D | BENCHMARK EXECUTION RESULT A |
| 5 | NO. OF EFFECTIVE FIGURES OF PROCESSOR E | BENCHMARK EXECUTION RESULT A |
| 6 | NO. OF EFFECTIVE FIGURES OF PROCESSOR F | BENCHMARK EXECUTION RESULT A |
| ⋮ | ⋮ 322 | ⋮ 323 |

FIG.9
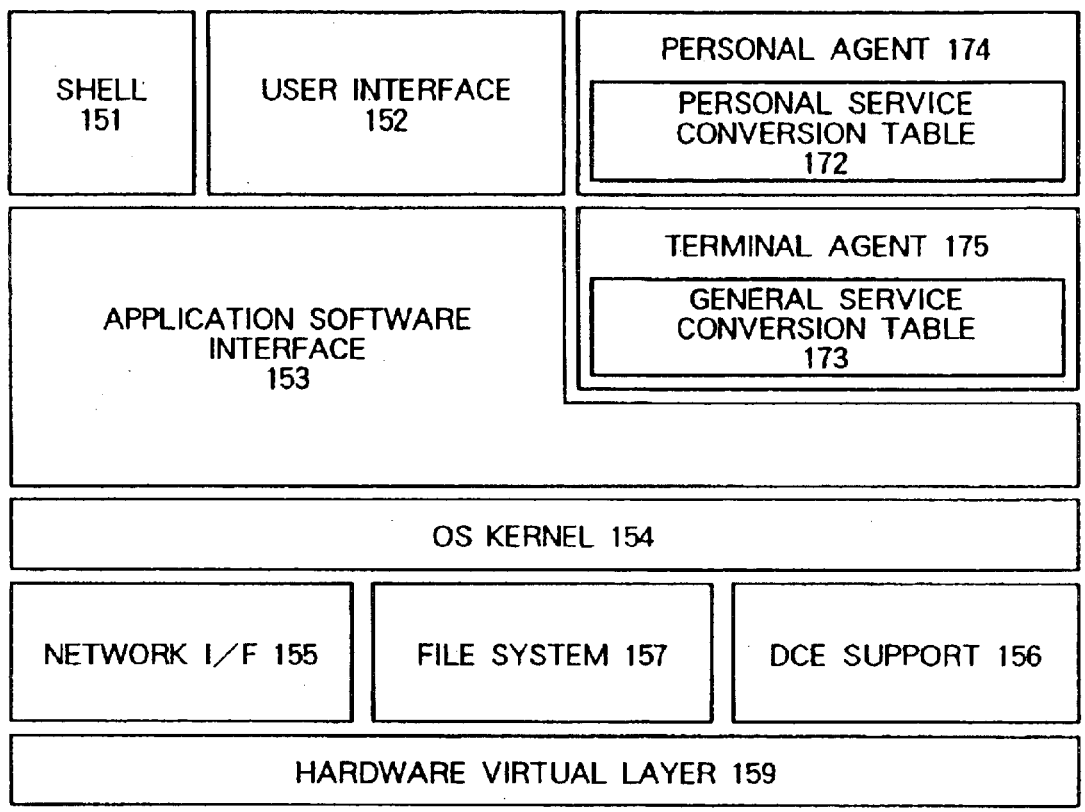
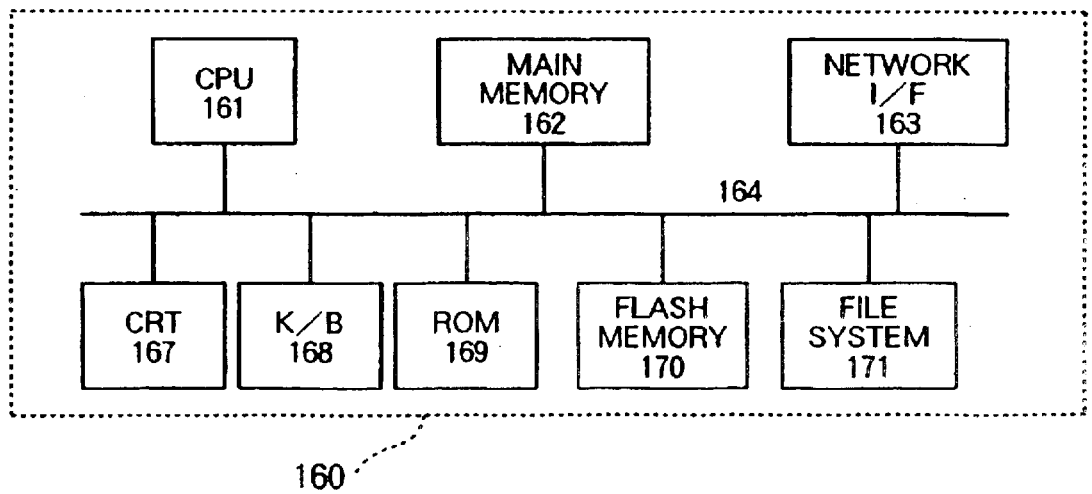

FIG.21

QOS TABLE

| APPARATUS NAME | I/O | REGISTRATION CONTENTS (FUNCTIONS,PERFORMANCE) |
|---|---|---|
| INFORMATION PROCESSING APPARATUS A | DISK | RAID, BACKUP |
| INFORMATION PROCESSING APPARATUS B | DISK | HIGH SPEED |
| | | |

FIG.22

SERVICE INFORMATION CONVERSION TABLE

| I/O | APPARATUS NAME | REGISTRATION CONTENTS (SERVICE) |
|---|---|---|
| DISK | INFORMATION PROCESSING APPARATUS A | BACKUP FUNCTION |
| DISK | INFORMATION PROCESSING APPARATUS B | HIGH SPEED |
| | | |

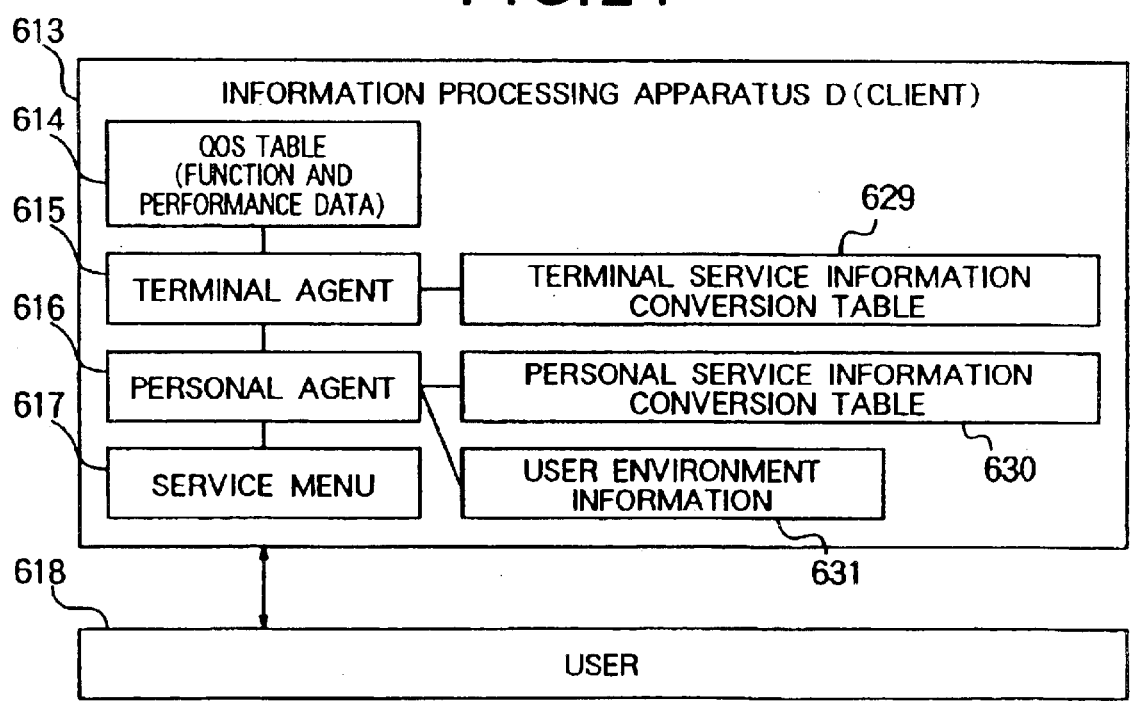

DATA PROCESSING APPARATUS AND NETWORK SYSTEM THAT OUTPUTS QUALITY OF SERVICE INFORMATION TO A USER

This application is a continuation of application Ser. No. 10/082,185, filed Feb. 26, 2002 now U.S. Pat. No. 6,519,640, which is a continuation of application Ser. No. 09/518,147 filed Mar. 3, 2000 (now U.S. Pat. No. 6,370,577), which is a divisional application of application Ser. No. 09/106,291 filed Jun. 29, 1998 (now U.S. Pat. No. 6,094,674), which is a divisional application of application Ser. No.: 08/434,291 filed May 3, 1995 (now U.S. Pat. No. 5,774,656).

BACKGROUND OF THE INVENTION

1. Field of the Invention

The present invention relates to an information processing system in which services are provided to end users of apparatuses connected via a network to each other and an information processing method and a service providing method for use with the information processing system.

2. Description of the Related Art

There has been generally known a client server system (CSS) including a network and a multiplicity of apparatuses which are connected via the network to each other and which include server machines having resources such as a large-capacity disk and a plurality of client machines to be operated individually by users so as to communicate information between the linked apparatuses. In most applications of the client server system, resources of server machines are shared among the users, for example, a disk resource of a server machine is commonly used to share a file thereon and/or a printer coupled with a printer server is shared among the users. Thanks to the recent development of basic software such as a network operating system (to be simply called network OS herebelow) and hardware including server and client machines, it is possible to implement environments of the client server systems for highly advanced utilizations and applications thereof.

For example, the Open Software Foundation (OSF) established as a standardization committee of computer industries has proposed an OSF DCE (to be abbreviated as DCE herebelow). In a complex network environment including different kinds of apparatuses, DCE provides such services as a directory service, a yellow page service, and an access right service.

In the directory service, a name specified by a user is converted into address information in the actual network system. This service is similar to the telephone number indexing service according to a telephone directory. The yellow page service is an additional function of the directory service. In place of the name, there can be used a function or an attribute to attain address information, which is similar to the indexing service through a classified telephone directory. The certification and access right services are used to conduct a security check when a user subscribes to the system or operates functions of the system, for example, to examine whether or not the user possesses the access right. Namely, these services are supported to control the system.

OSF DCE has been described in detail, for example, in the "Technology of OSF DCE" published by Soft Research Center Inc. on Aug. 25, 1992 (ISBN 4-915778-15-0).

According to services provided in the present CSS environments described above, when receiving a particular service, end users operating client machines are required to pay attention to usage of the service in most cases. For example, when a file is shared between clients, it is necessary to specify the file name assigned by the partner to the shared file and a position of the directory in the own client machine to which the shared file is registered (mounting of the file). Only after the above operations are completed, the file can be shared between the clients.

Some systems can be accessed by the end user without considering any particular service. However, in such systems, the system manager is required to beforehand set the desired services according to the present stage of art. According to DCE, services are enriched primarily for the managers conducting the system management. This consequently leads to a problem that end users can actually access only the information items and services beforehand set by the system manager.

Additionally, as the range of apparatuses and devices connectible to CSS is expanded, there appear various kinds of end users accessing the system. This increases chances in which the system is operated by beginners of the system who are learning information related to operations and functions of information processing apparatuses. In such a case, there arises a problem that the services supported by CSS and available by end users are hardly utilized.

Furthermore, when accessing the system, most end users do not have special knowledge about specifications and characteristics of apparatuses of the system. For example, the users operate apparatuses without recognizing functions and services supported by devices (such as disks), for example, the remaining capacity and transfer performance of each disk and reliability of data storage. Consequently, only the system experts can appropriately utilize the system resources. Namely, the system can be operated only in an inefficient fashion by the ordinary end users.

SUMMARY OF THE INVENTION

It is therefore an object of the present invention to provide an information processing system, a method for use with the same, and a service providing method for use in the system which allow users not fully versed in services of the system to appropriate utilize the services of the system, thereby solving the problems above.

Another object of the present invention is to provide an information processing system, a method for use with the same, and a service providing method for use in the system which allows users not fully versed in services of CSS to appropriately utilize the services of CSS.

Further another object of the present invention is to provide an information processing system, a method for use with the same, and a service providing method for use in the system which guarantees quality of service (QSO) supported for end users by the system.

To solve the problems above according to the present invention, there is provided an agent function including two kinds of agents, namely, a personal agent to control user information so as to relate a service supported by the information processing system to a process requested by the user and a terminal agent to control the apparatuses. The terminal agent supervises information items of functions, performance, and the like of apparatuses connected to the network to convert such information into service information necessary for the user. Moreover, the terminal agent controls terminals and clients operated by users. The personal agent provides data control and service operations customized for each user.

According to the present invention, there is disposed a service information conversion section to transform information of functions, performance, and the like of the respective apparatuses into service information. The conversion section includes a general service conversion table for the terminal agent to convert service information and a personal service conversion table for the personal agent to convert service information customized for the pertinent user.

Moreover, according to the present invention, the terminal agent controls the basic portion of the user interface for the terminal and client operated by the user and converts information of functions and performance of the apparatuses connected to the network into service information for the user interface. The personal agent further supervises such customized functions as information of the security function for each user in relation to the user interface.

According to the present invention, for each of the apparatuses connected to each other via the network, there is arranged a quality of service (QOS) table defining information of functions and performance of the apparatus. The plural QOS tables are controlled by a local directory for each cell corresponding to a small range of the network. All local directories covering the entire network system are controlled by a global directory.

In addition, according to the present invention, when an apparatus is coupled to the network, a QOS table is automatically registered to the local directory. Furthermore, when the contents of registration are modified in the local directory, the changed contents are notified to the global directory.

According to the present invention, there is employed broadcast means as the means for registering the QOS table to the local directory.

Furthermore, according to the present invention, there are disposed in the information processing apparatus state monitoring means for monitoring the state of each section of the apparatus, means for accumulating therein information of the state thus collected by the state monitoring means, and a network interface to be used only by the state monitoring means.

According to the present invention, there is provided an information processing system including a plurality of information processing apparatuses each having a table to which information of functions and performance is registered, a network for connecting the plural information processing apparatuses to each other, a directory connected to the network for controlling the tables of the respective information processing apparatuses, and an agent function operable in either one of the information processing apparatuses for referencing contents of the control operation of the directory and supplying a user with the information of functions and performance of information processing apparatuses registered to the table. Furthermore, in the information processing system, the agent function includes a user associated operation for conducting a customizing operation for each user and thereby supplying the service information to the user, and an operation for supplying the user with service information independent of any particular user. In addition, in the information processing system, the information of functions and performance to be registered to the table includes either one or all of a transfer speed, a random input/output performance, an access time, a bit error ratio, a mean time to data loss (MTTDL), a mean time for data availability (MTDA). Moreover, in the information processing system, the information of functions and performance to be registered to the table includes either one or all of a name of the information processing apparatus and a type, function, performance of an input/output device of the information processing apparatus.

According to the present invention, there is provided an information processing system comprising information processing apparatuses each having a QOS table to which functions and performance to be supplied via a network to a user is registered, wherein the apparatuses are connected to the network.

Additionally, according to the present invention, there is provided an information processing system including a plurality of information processing apparatuses each having a table to which information of functions and performance is registered, a network for connecting the plural information processing apparatuses to each other, and a directory connected to the network for controlling the tables of the respective information processing apparatuses.

Furthermore, according to the present invention, there is provided an information processing system including a plurality of information processing apparatuses each having a table to which information of functions and performance is registered, a network for connecting the plural information processing apparatuses to each other, a local directory connected to the network for controlling the tables of the respective information processing apparatuses, and a global directory for controlling the local directory.

Moreover, according to the present invention, there is provided an information processing system including a plurality of information processing apparatuses each having a table to which information of functions and performance is registered, a network for connecting the plural information processing apparatuses to each other, a directory connected to the network for controlling the tables of the respective information processing apparatuses, and an agent function operable in either one of the information processing apparatuses for referencing contents of the control operation of the directory and converting the information of functions and performance registered to the table into service information, thereby supplying a user with the obtained service information.

In addition, according to the present invention, there is provided an information processing system including a plurality of information processing apparatuses each having a QOS table to which information of functions and performance is registered, a network for connecting the plural information processing apparatuses to each other a local directory connected to the network for controlling a plurality of QOS tables in a unit of local areas, the local area being a set of small-sized areas, a global directory for controlling a plurality of local directories in a global area of the unit of local areas, and an agent function operable in either one of the information processing apparatuses for referencing contents respectively of the global and local directories and converting the information of functions and performance registered to the QOS table into service information representing quality of service, thereby supplying a user with the obtained service information.

Furthermore, in the information processing system, the agent function includes a user associated operation for conducting a customizing operation for each user and thereby supplying the service information to the user and an operation for supplying the user with service information independent of any particular user. According to the present invention, in the information processing system, the agent function includes reading contents of the plural QOS tables registered to the local directory, detecting a plurality of common functions registered to the QOS tables, and creating a service menu therefrom.

In addition, according to the present invention in the information processing system, the agent function further includes generating a QOS menu for each of the services and supplying the user with the QOS menu. Moreover, in the information processing system, the QOS table includes as information of functions and performance of the information processing apparatus either one of a response time, a processing performance per unitary time, and a transfer speed.

Additionally, according to the present invention, there is provided an information processing system including a plurality of information processing apparatuses each having a QOS table to which information of functions and performance is registered, a network for connecting the plural information processing apparatuses to each other, a local directory connected to the network for controlling a plurality of QOS tables in a unit of local areas, the local area being a set of small-sized areas, a global directory for controlling a plurality of local directories in a global area of the unit of local areas and receiving, when contents of the local directory are changed, a notification of change in the contents from the local directory, and an agent function operable in either one of the information processing apparatuses for supplying a user with the information of functions and performance of the apparatus, wherein the agent modifies, according to contents of the change in the global directory, contents of service information to be supplied to the user.

In the information processing system according to the present invention, the local directory reads, when a new information processing apparatus is connected to the network, a QOS table of the new apparatus and registers the QOS table to the system.

According to the present invention, in the local directory of the information processing system deletes, when one of the information processing apparatuses is disconnected from the network, the QOS table of the disconnected apparatus.

Furthermore, there is provided according to the present invention an information processing system including a plurality of information processing apparatuses each having a QOS table to which information of functions and performance is registered, a network for connecting the plural information processing apparatuses to each other, a local directory connected to the network for controlling a plurality of QOS tables in a unit of local areas, the local area being a set of small-sized areas, a global directory for controlling a plurality of local directories in a global area of the unit of local areas, and an agent function operable in either one of the information processing apparatuses for referencing contents respectively of the global and local directories and converting the information of functions and performance registered to the QOS table into service information representing quality of service, thereby supplying the obtained service information to a user via a user interface. The agent changes, according to a utilization frequency of each service of the-user and contents of utilization of services, contents of the service information supplied to the user via the user interface.

Additionally, in the information processing system of the present invention, the agent function in the information processing apparatus includes a service access agent for controlling the user interface, a personal agent service for achieving a customization corresponding to each user and supplying the service information to the user and a public agent service for supplying a plurality of services shared among the users.

In the information processing system according to the present invention, the personal agent service is disposed in a client which is a terminal equipment in any one of the plural information processing apparatuses and a copy of the personal agent service is arranged in a server which achieves a control operation in the plural information processing apparatuses.

Moreover, in the information processing system, the agent function in the information processing apparatus includes monitoring a state of each application software initiated by each user and changing, according to a state of operation of the application software, contents of the service information supplied to the user via the user interface.

Furthermore, according to the present invention, there are provided an information processing method and an information processing system using the method including the steps of collecting by an information processing apparatus information of each input/output device connected to a network when the apparatus is activated and notifying the information to other information processing apparatuses via the network.

Additionally, according to the present invention, there are provided an information processing method and an information processing system using the method including the steps of transmitting a request for input/output device information from an information processing apparatus when the apparatus is activated to other information processing apparatuses via a network and thereby collecting input/output information of the information processing apparatuses.

In addition, according to the present invention, there are provided an information processing method and an information processing system using the method including the steps of executing a predetermined benchmark program for a new information processing apparatus connected to a network and registering a result of the test to a QOS table of a directory.

In the information processing method and the information processing system using the method, the notification is achieved by a broadcast communication.

According to the present invention, there is provided a service supplying method for use with an information processing system including a network and information processing apparatuses connected thereto. The method includes the steps of collecting, when a request for information of a state of each section of the information processing apparatus is received via the network, the information of the state of each section independently of operation of the apparatus and transmitting the information to the network via a network interface of state monitor means for monitoring the state of each section.

According to the present invention, there is provided a service supplying method for use with an information processing system including a network and information processing apparatuses connected thereto. The method includes the steps of collecting, when a request for information of a state of each section of the information processing apparatus is received according to a communication protocol via the network, the information of the state of each section independently of operation of the apparatus, converting the information according to the communication protocol, and transmitting the resultant information to the network via a network interface of state monitor means for monitoring the state of each section.

Furthermore, according to the present invention, there is provided an information processing system including a plurality of information processing apparatuses each having a QOS table to which information of functions and performance is registered and a network for connecting the plural information processing apparatuses to each other, wherein any desired one of the information processing apparatuses includes an agent function for referencing contents of the QOS tables of the plural apparatuses connected to the network and converting the information of functions and performance of the apparatuses registered to the QOS tables into service information representing quality of service, thereby supplying a user with the obtained service information.

Additionally, according to the present invention, there is provided a service supplying method for use with an information processing system in which a plurality of information processing apparatuses each having a QOS table to which information of functions and performance is registered are connected to each other via a network. The method includes the steps of referencing, in an agent function of any desired one of the apparatuses, contents of the QOS tables of the plural apparatuses connected to the network and converting the information of functions and performance of the apparatuses registered to the QOS tables into service information representing quality of service, thereby supplying a user with the obtained service information.

Additionally, according to the present invention, the user interface indicating QOS information representing functions, performance, and services of the information processing apparatus includes either one or all of menu information items respectively related an online storage, a mobile picture quality, and a backup storage.

According to the present invention, the terminal agent inquires of the global and local directories via the network about the QOS table of each apparatus connected to CSS and then converts obtained information of functions and performance of the apparatus into service information necessary for the user, thereby supplying the service information directly to the user.

In case where the terminal agent achieves the conversion of service information, the information of functions and performance of the apparatus is transformed into service information necessary for the user according to the contents of registration in the general service conversion table of the service information conversion section. Consequently, service information to be delivered to the user can be altered according to the contents of registration in the service information conversion section.

Furthermore, the terminal agent supervises the basic portion of the user interface of the client to display common functions and to supply common services to each user. In consequence, when the contents of the terminal agent is varied, the interfaces and service information items can be changed for all users.

The personal agent inquires of the global and local directories in a manner similar to that of the terminal agent about functions and performance of each apparatus linked with CSS to convert the attained information of functions and performance of the apparatus into service information necessary for the user so as to supply the service information to the user. When the service information is delivered from the personal agent to the user, an inquiry is sent to the terminal agent to send the service information to the user such that the terminal agent reports the information via the user interface to the user.

On receiving a service request from the user, the personal agent issues an inquiry for the contents of the QOS table of each apparatus registered to the global and local directories to notify the user's service request to the apparatuses having functions and performance associated with the service request.

Moreover, in case where the personal agent converts information of functions and performance of the apparatuses connected to CSS into service information necessary for the user, the conversion of information is accomplished according to information of conversion registered to the personal service conversion table of the service information conversion section. Consequently, arranging a personal service conversion table for each user, it is possible to supply the user with service information customized for the user.

The personal agent updates the contents of the personal service conversion table according to the frequency of service requests from the respective users and the utilization frequency of each particular service.

As described above, the terminal and personal agents recognize service information of the respective apparatuses connected to CSS. The terminal agent supervises the user interface to notify services to the users, whereas the personal agent controls the contents of user's service requests. Communicating the above information between the terminal and personal agents, the service requests from the users can be mapped onto the system services.

According to the present invention, the state monitor means communicates with the information processing system via the network interface dedicated to the state monitoring means. In response to a request for information related to the state of each section of the information processing apparatus, the state monitor means collects information via the network interface independently of operation of the information processing system, thereby transmitting the attained information to the request source.

BRIEF DESCRIPTION OF THE DRAWINGS

These and other objects and advantages of the present invention will become apparent by reference to the following description and accompanying drawings wherein:

FIG. 1 is a diagram showing the system configuration of an embodiment according to the present invention;

FIG. 2 is a diagram schematically showing an embodiment of the local directory according to the present invention;

FIG. 3 is a diagram showing structure of an embodiment of the service information conversion section according to the present invention;

FIG. 5 is a diagram showing structure of an embodiment of the global directory according to the present invention;

FIG. 7 is a diagram showing another embodiment of the service information conversion section according to the present invention;

FIG. 9 is a diagram showing another constitution of the agent according to the present invention;

FIG. 21 is a diagram showing structure of an embodiment of the QOS table according to the present invention;

FIG. 22 is a diagram showing an embodiment of the service information conversion table according to the present invention;

FIG. 23 is a diagram showing an embodiment of the user environment information table according to the present invention;

FIG. 24 is a diagram showing details of information processing apparatus D;

DESCRIPTION OF THE PREFERRED EMBODIMENTS

Figure 4:
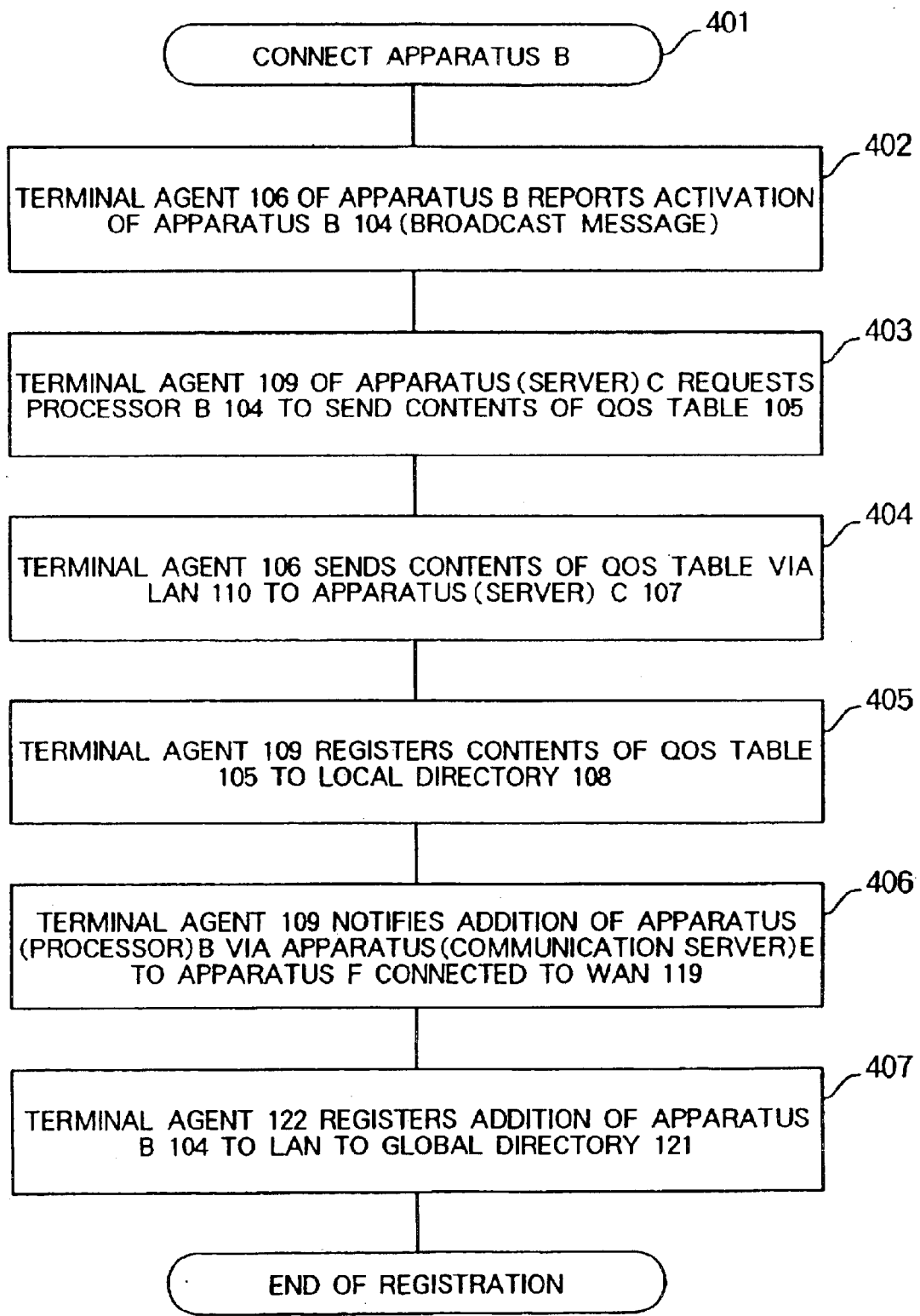
FIG. 4 is a flowchart showing a flow of registration in the QOS table.

Referring now to FIGS. 1 to 9, description will be given of an embodiment of the computing service according to the present invention.

FIG. 1 shows in a block diagram the system configuration of the embodiment. In FIG. 1, information processing apparatuses A 101, B 104, C 107, D 111, and E 117 are connected to each other via a local area network (LAN) 110. LAN 110 is linked with a wide area network (WAN) 123 via the processor E as a communication server and hence is coupled with an information processing apparatus F 120 on WAN 123. The processing apparatuses A, B, D, and E respectively include QOS tables 102, 105, 112, 118. The apparatuses A to F include terminal agents 103, 106, 109, 113, 119, and 122, respectively. The terminal agents supervise interfaces between the pertinent information processing apparatus and LAN 110 and other information processing apparatuses.

Description will be now given of a case in which the user operates the apparatus D as a client. When the apparatus is activated, the terminal agent 113 and a personal agent 115 issue an inquiry to the apparatus 107 as a server on LAN 110 for resources on the network registered to a local directory 108. The terminal agent 109 of the apparatus C 107 transmits the contents of the local directory 108 to the information processor D 111.

FIG. 2 shows an example of constitution of the local directory. In FIG. 2, a QOS table registration section 301 includes registration items 302 and registration contents 303. One QOS registration section 301 corresponds to one QOS table of each information processing apparatus. An item representing a function or performance of the processor is registered as the registration item 302, whereas the contents of the item is set to the registration contents field 303. A network address registration section 304 includes resource names 305 of resources connected to the system and network addresses 306.

In case where the user desires to access the processor from the processor D, the user issues a service request and receives the service via the terminal agent 113, personal agent 115, and service menu 116. The terminal agent 113, personal agent 115, and service menu 116 will be described later in detail in paragraphs related to the user interface. On receiving a usage request for computing resources from the user, the terminal agent 113 inquires of the processor C 107 as the server about computing resources. The terminal agent 109 of the processor C accomplishes a retrieval operation for the contents of the local directory 108 to sends information of functions and performance of the registered computing resources via LAN 110 to the processor D 111. On receiving information, the terminal agent 113 converts the information by a service information conversion section 114 into service information for the user to report the service information to the user via the personal agent 115 and service menu 116.

FIG. 3 shows an embodiment of the service information conversion section 114 according to the present invention. In FIG. 3, the section 114 includes a general information conversion table 307 to conduct conversion for service information common to the plural users and a personal service conversion table 310 corresponding to a particular user.

The general service conversion table 307 includes a table 308 to store therein information of functions and performance of resources connected to the network and attained from the local directory 108 of the server and a table 309 to accumulate therein service information to the user corresponding to the functions and performance of the resources. Moreover, there is stored in the personal service conversion table 310 service conversion information for the personal agent 115 to optimize the service menu for the pertinent user according to the service utilization state of the user and the operation state of application software in the processor D 111.

For example, FIG. 3 shows a case in which the display sequence of services are altered in the service menu 116 according to the state of utilizations of respective services. For each service information item supported by the terminal agent 113, the personal agent 115 registers the utilization frequency of the user to a usage frequency table 311 to register items to a display order table 312 indicating the display sequence of the services on the service menu according to the utilization frequency. According to the information items registered to the personal service conversion table 310, the user agent displays the menu in association with the degree of operation dexterity and utilization state of each user.

Next, description will be given of a case in which the information processing apparatus (processor) B 104 is connected to LAN 110 in the embodiment shown in FIG. 1. When linking a new information processor with the information processing system including the network, a QOS table 105 of the processor B 104 is registered to the local directory 108 controlled by the information processing apparatus (server) C 107. FIG. 4 shows the flow of registration of the QOS table 105. When the processor B 104 is coupled with LAN 110 (step 401), the terminal agent 106 transmits a broadcast message to notify connection and activation of the processor B 104 to the other apparatuses on the network.

The terminal agent 109 of the processing apparatus C 107 as the server on the network requests the processor B 104 to transmit thereto the contents of the QOS table 105 (step 403). The terminal agent 106 sends the contents of the QOS table 105. The terminal agent 109 registers the contents of the QOS table 105 to the local directory 108 (step 405). Moreover, the apparatus C 107 reports the modification of the contents of the local directory 108 via a communication server 117 to a global directory 121 controlled by the apparatus F 120 on WAN 123 (step 407). The terminal agent 122 registers the modification of the local directory 108 to the global directory 121 (step 407) and then terminates the operation.

FIG. 5 shows an embodiment of the global directory 121 according to the present invention. The global directory includes a local directory registration part 313 to which the plural local directories of the system are registered and a resource registration part 316 to which types of resources registered to the local directories are registered. The local directory registration part 313 includes local directory names 314 and gateway addresses of LAN 315 controlled by each local directory. The gateway address filed 315 contains a logical or physical address decided by a protocol of the network. Registered to the resource registration part 316 are resource types 317 controlled by the local directories and connection directories 318 of the respective resources.

On receiving an inquiry for a resource from a terminal agent, the global directory 121 is accessed such that the resource registration part 316 is first referenced to decide the resource type 317 and connection directory 318 and then the gateway address 315 of the pertinent local directory is transmitted from the local directory registration part 313. The network address of the server supervising the local directory may be transmitted in place of the gateway address 315.

Figure 6:
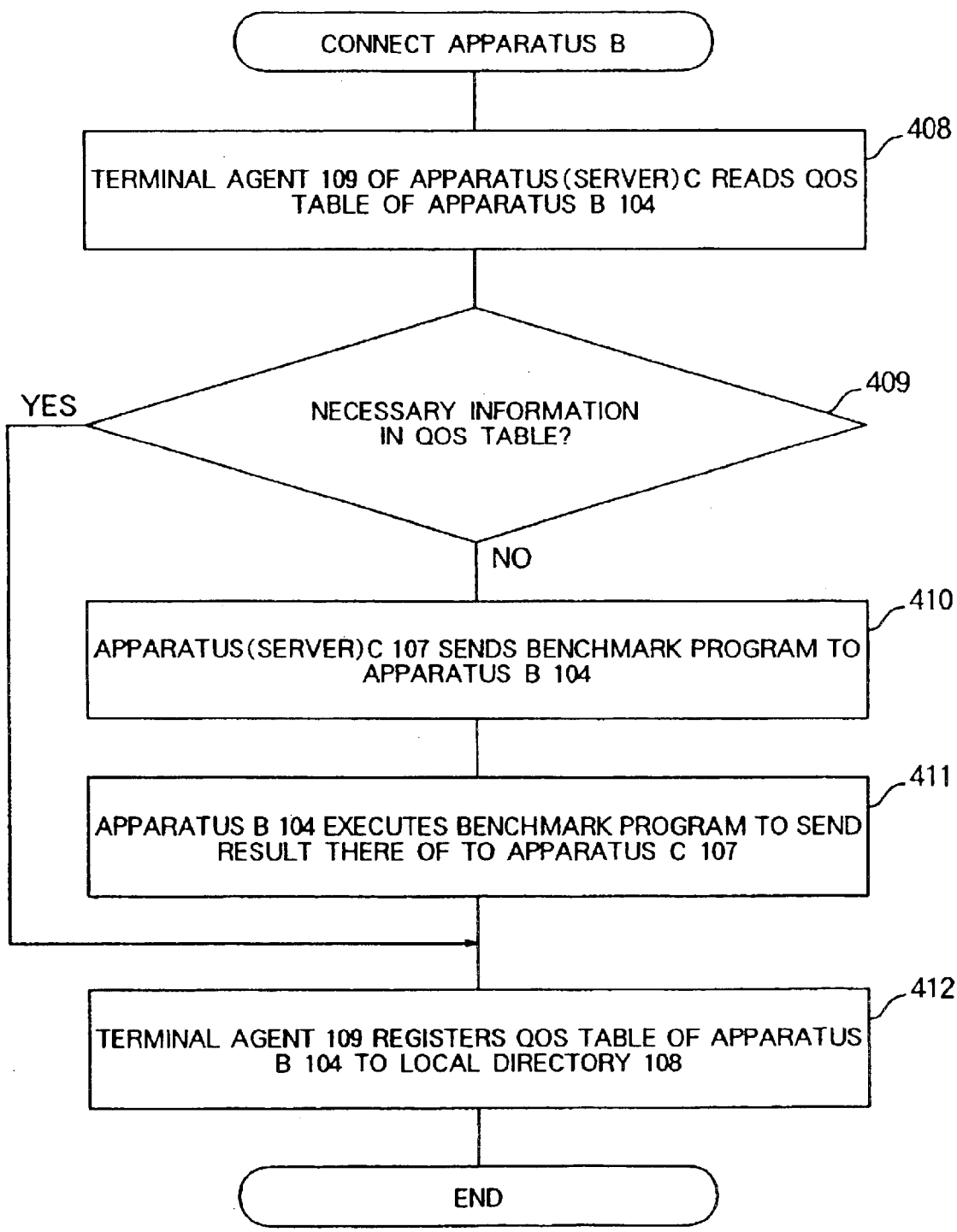
FIG. 6 is a flowchart showing an automatic generation of the QOS table.

FIG. 6 shows a flow of operation to connect an information processing apparatus not having the QOS table to the system. For the apparatus not including the QOS, for example, for a computing resource, it is only necessary to execute a predetermined benchmark program so as to register the result thereof as a QOS table to the local directory 108. In FIG. 6, when the processing apparatus B 104 of FIG. 1 is connected to LAN 110 and the QOS table is missing in the apparatus B 104 (steps 408 and 409), the processing apparatus C 107 sends a predetermined benchmark program to the apparatus B 104 (step 410). The apparatus B 104 executes the benchmark program and then transmits the result thereof to the apparatus C 107. The subsequent operations are the same as for the apparatus B 104 having the QOS table.

FIG. 7 shows another embodiment of the service information conversion part 114 of FIG. 1 according to the present invention. In the service information conversion part 114, information of functions and performance of the information processing apparatuses is converted into service information for the users. For this purpose, as shown in FIG. 7, the general service conversion table 319 contains as the information of functions and performance the number of effective FIGS. 320 of each processor as the computing resource of the system such that the number of effective FIGS. 320 is transformed into a user service information item 321 indicating a suitable usage of the processor. Moreover, in the personal service conversion table 324, the number of effective figures 322 is transformed into a predetermined benchmark program result 323 as the user service information. The number of effective figures of the processor can be set by selecting a desired benchmark program so as to achieve processing according to a favorable evaluation method or a desired processing precision.

Figure 8:
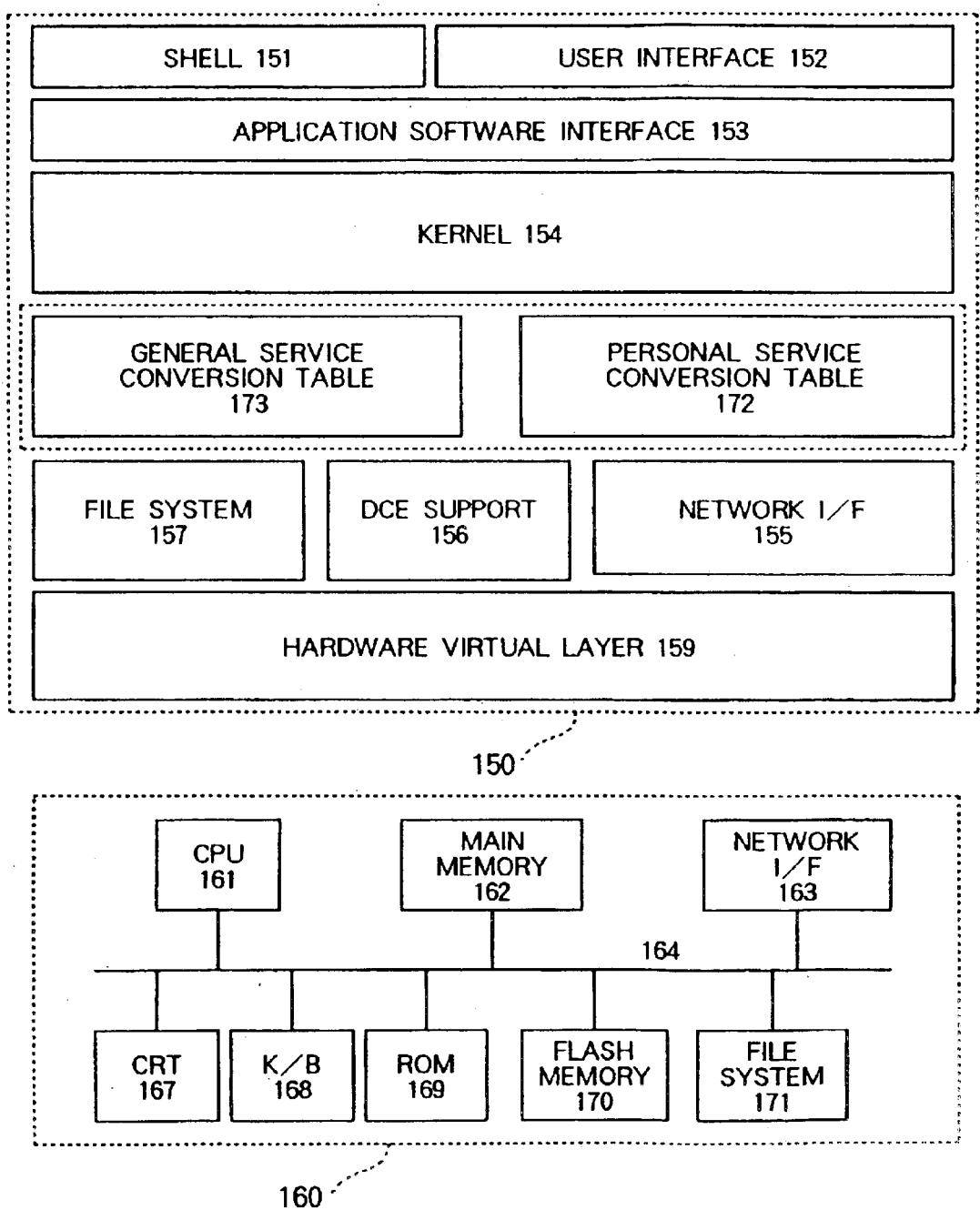
FIG. 8 is a diagram showing constitution of an embodiment of the agent according to the present invention.
Figure 10:
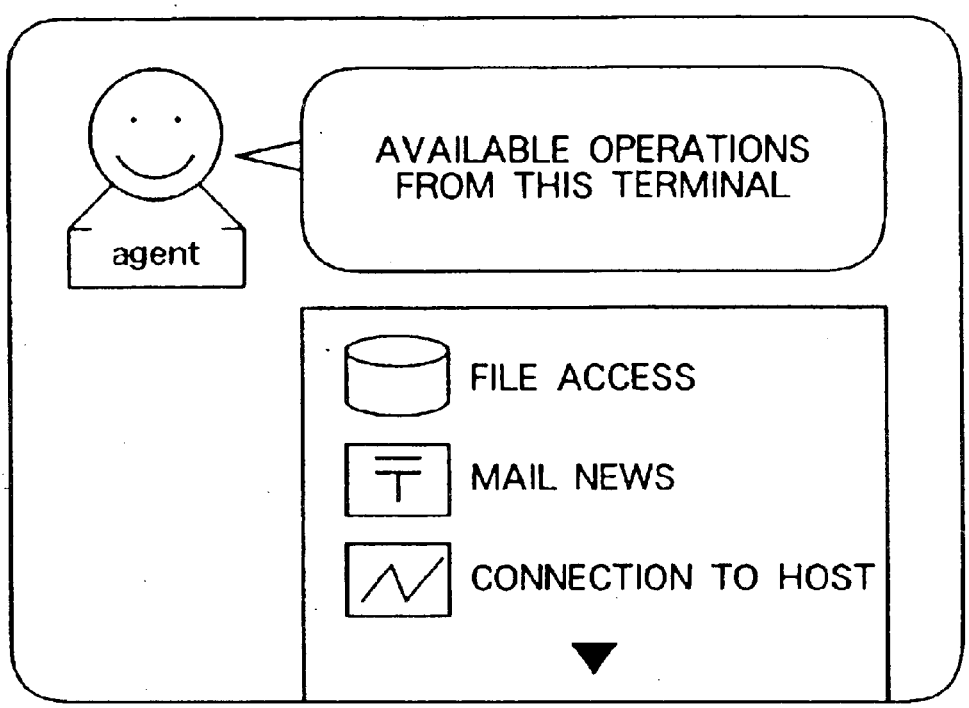
FIG. 10 is a diagram showing a service menu.

Referring now to FIGS. 8 and 9, description will be given of the agent function according to the present invention. FIG. 8 shows constitution of an embodiment of the agent function according to the present invention. An agent function 150 is implemented by software operating in the information processing apparatus 160. Each part of the agent function 150 operates as follows. A hardware virtual layer 159 copes with or absorbs differences between the plural apparatuses 160 to suppress influences of hardware discrepancies upon operation of software. A file system 157 controls a file system 171 of the apparatus 160, whereas a network interface (I/F) 155 supervises a network interface 163. A DCE support 156 has a function to support open software foundation (OFS)/DCE environments. OFS/DCE has already been described in conjunction with the conventional example and hence will not be described in this paragraph.

A general service conversion table 173 and a personal service conversion table 172 collectively correspond to the service information conversion part 114 of FIG. 1. The conversion table 173 is a registration table to transform information of system functions and performance shared among the plural users into service information for the users. The personal service conversion table 172 is a table for accumulating therein such information of each user as information related to transformation of service information for a particular user and customized information of the user interface 152. A kernel 154 is the primary function of the agent to control the other functional blocks. A shell 151 and the user interface 152 are arranged in an application interface 153. The user interface 152 controls a cathode-ray tube (CRT) 161 of the apparatus 160 to support the interface operation for the users.

The apparatus 160 includes peripheral devices such as a keyboard (K/B) 168, a read-only memory (ROM) 169, and a flash memory 170. These peripheral devices are connected via a system bus 164 to a CPU 161 and a main memory 162.

Ordinarily, the agent is stored in a non-volatile memory such as the ROM 169 or flash memory 170 or in a secondary storage such as a file system 171. After the system operation is started, the agent is loaded in the main memory 162 to be executed by the CPU 161. The QOS tables 102, 105, 112, and 118 of FIG. 1 are usually stored in the non-volatile memory such as the ROM 169 or flash memory 170. When the system is initiated, these tables are stored in the main memory 162 or the file system 171 by the agent 150.

FIG. 9 shows another example of the agent.

In FIG. 9, the agent includes a terminal agent 175 to conduct conversion for services shared among the plural users and a personal agent 174 to customize a service conversion method and a user interface for a particular user. The personal agent 174 communicates information via the terminal agent 175. The other constituent components of FIG. 9 are the same as those shown in FIG. 8 and hence description thereof will be avoided.

Referring next to FIGS. 10 to 17, description will be given of an embodiment of the user interface of QOS according to the present invention.

This embodiment is an example of access from a satellite office to a home office. When an arbitrary terminal is activated in the satellite office, the terminal agent of the terminal starts its operation to display a service menu (FIG. 10) indicating services available from the terminal. In the service menu of FIG. 10, the service items are displayed in the utilization frequency order under control of the terminal agent of the terminal.

When connecting the terminal to the host computer of the home office, the user selects "Connect to host" from the menu and then clicks the pertinent input device. On receiving the notification of operation, the terminal agent of the terminal displays the QOS menu (FIG. 11) for conditions of connection methods.

Figure 11:
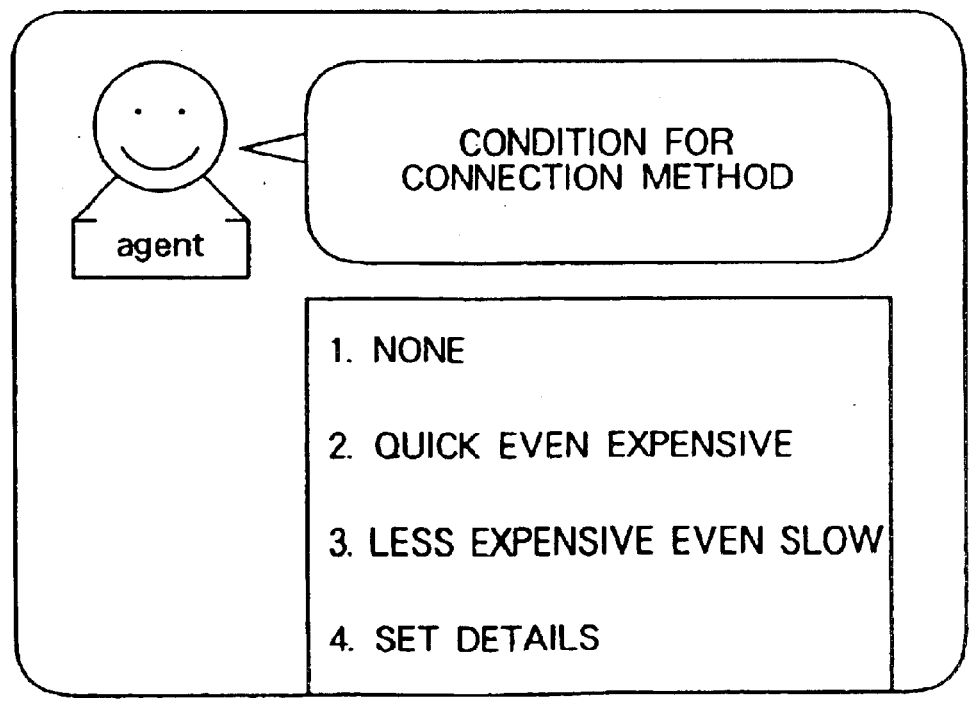
FIG. 11 is a diagram showing a QOS menu.

In the embodiment, the QOS menu of FIG. 11 includes four selection items "None", "Quick even expensive", "Less expensive even slow", and "Set details". When "None" is selected, the terminal agent chooses a route according to the default value to connect the terminal to the host computer of the home office.

When the user selects "Quick even expensive", the terminal agent establishes a route to carry out communication at an available highest speed. When "Less expensive even slow" is selected, there is chosen a route for communication at a possibly lowest cost. When the user selects "Set details", the selection of the route is achieved by the user. Assume that the user selects "None" in this embodiment. In this case, the terminal agent selects a route according to the default value to establish connection to the host computer of the home office, and a login screen (FIG. 12) of the host computer is presented on the terminal.

Figure 12:
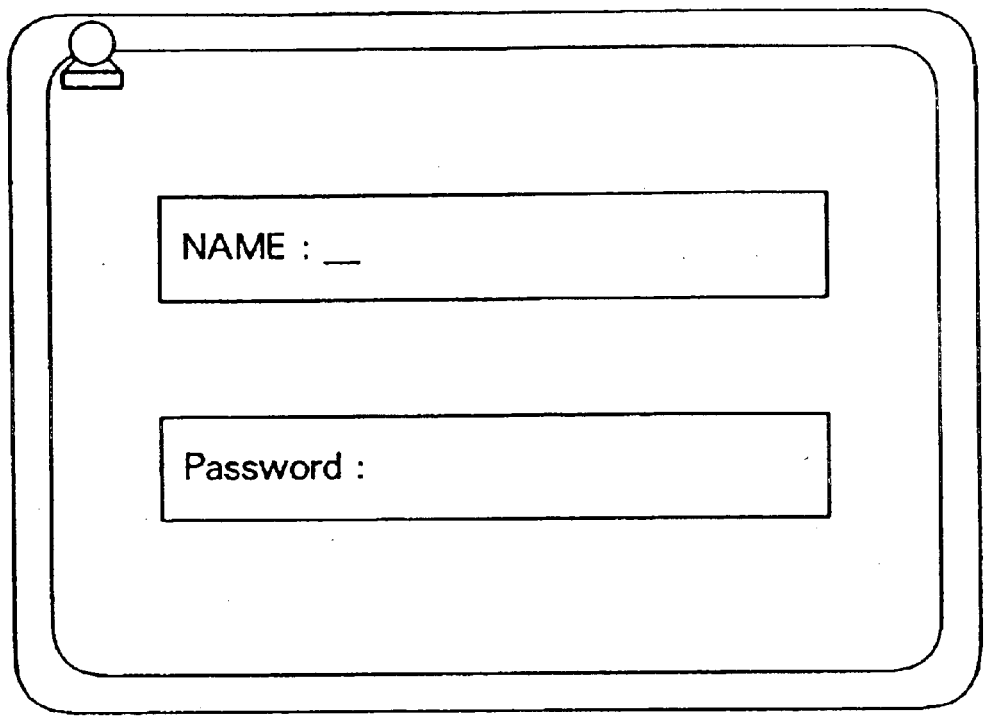
FIG. 12 is a diagram showing a login menu.

Although the login screen of FIG. 12 is similar to that used in the conventional, an icon of the terminal agent is displayed in the upper-left corner of the screen. When the user clicks the icon when necessary, the terminal agent of the terminal is invoked to conduct an operation to change the setting of, for example, the screen size. When the login is normally executed, the personal agent is initiated in the host computer of the home office and then there is presented an initial service menu screen (FIG. 13) corresponding individually to the user.

Figure 13:
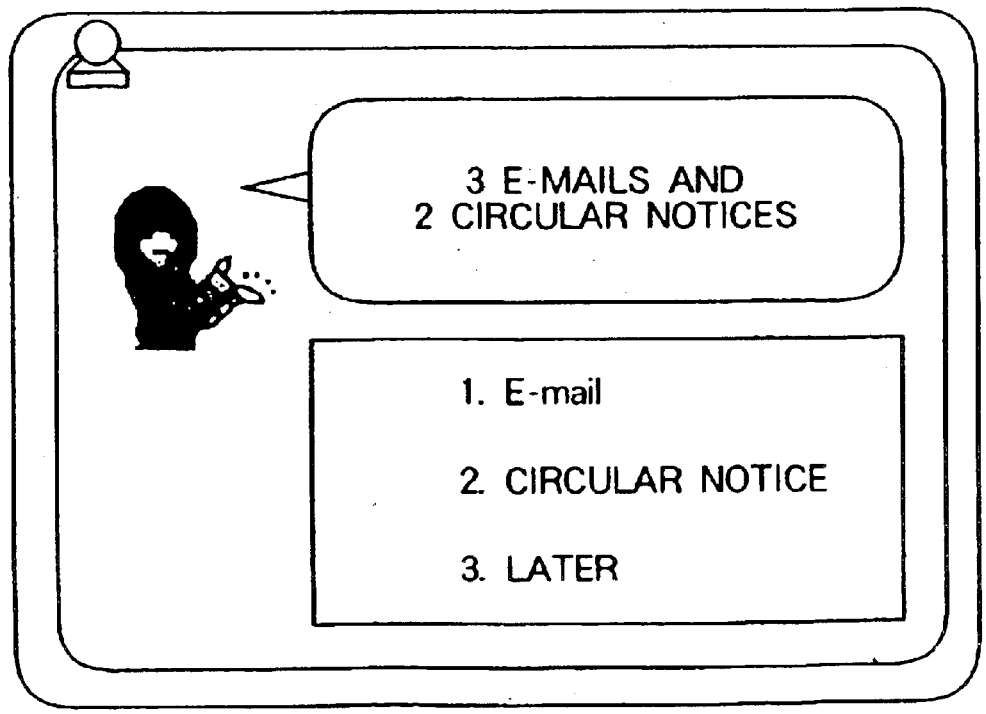
FIG. 13 is a diagram showing an initial service menu.

In FIG. 13, the personal agent indicates reception of three electronic mail items for the user and two circular notices of the work-flow software. The service menu includes items of "E-mail (read electric mail)", "Circular notice (examine notice)", and "Later". When the user chooses "E-mail", the electronic mail software is invoked to display the first mail item. When "Circular notice" is selected, the work-flow software is activated to present the first circular notice. When the user selects "Later", the personal agent displays another service menu. Assume that the user selects "Circular notice" in this embodiment. In response thereto, the personal agent initiates the work-flow software to present the first circular notice, namely, circular notice 1 (FIG. 14).

Figure 14:
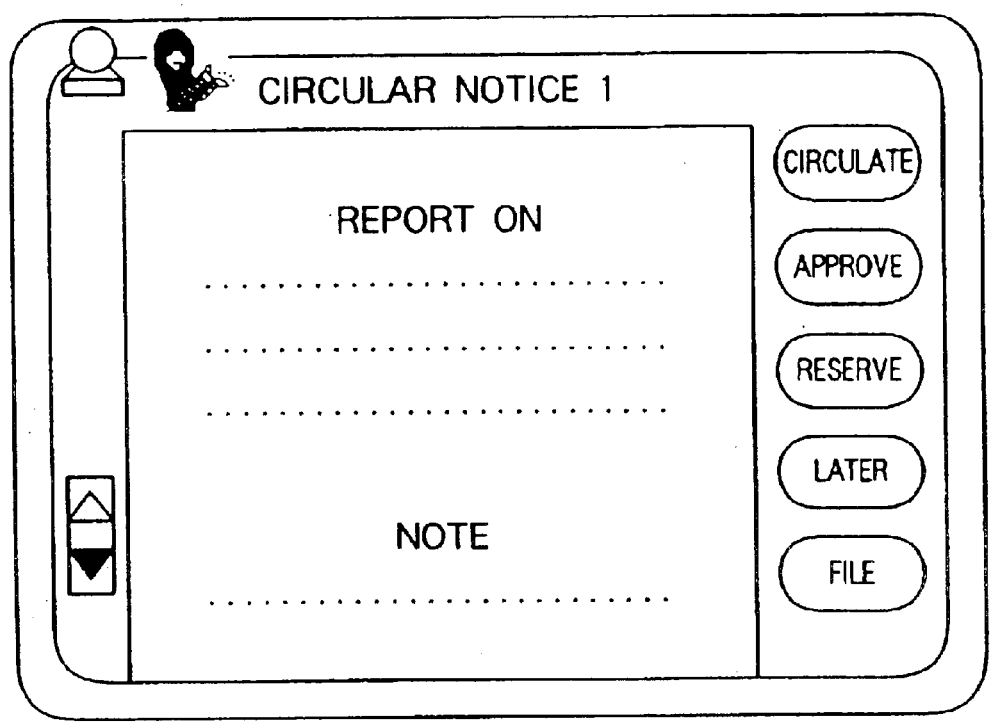
FIG. 14 is a diagram showing a display example of the personal agent.

In the screen of the work-flow software shown in FIG. 14, the user can process circular notices according to the operation procedure of the pertinent software. Although the screen image of FIG. 14 is similar to the login screen image conventionally used, there are displayed icons respectively of the terminal agent and personal agent in the upper-left corner of the screen. When necessary, the user clicks either one of the icons to invoke the desired agent. In this embodiment, it is assumed that the user activates the personal agent icon to start operation of the personal agent.

Figure 15:
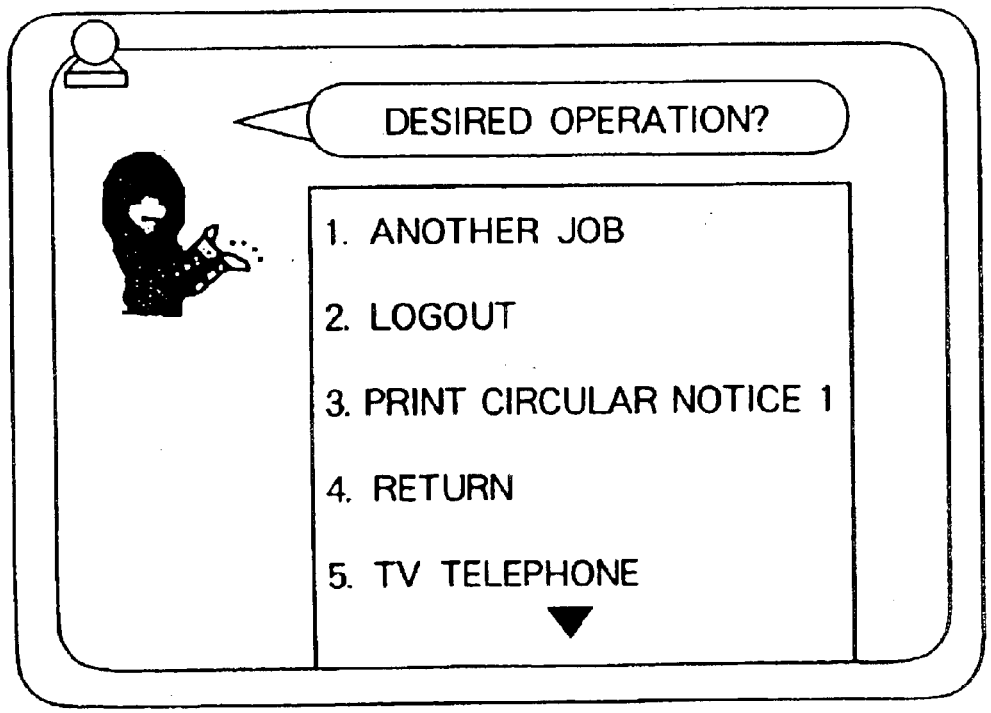
FIG. 15 is a diagram showing a service menu of the personal agent.

In this situation, the work-flow software is concealed in the background and a service menu (FIG. 15) is presented by the personal agent. When it is desired to produce a printout of circular notice 1, the user selects "Print circular notice 1" from the service menu of FIG. 15 and clicks the input device. The service menu of FIG. 15 is controlled in the frequency order by the personal agent. The personal agent monitors the state of the work-flow software in the background and hence "Print circular notice 1", "To next circular notice", and the like are added to the menu.

Figure 16:
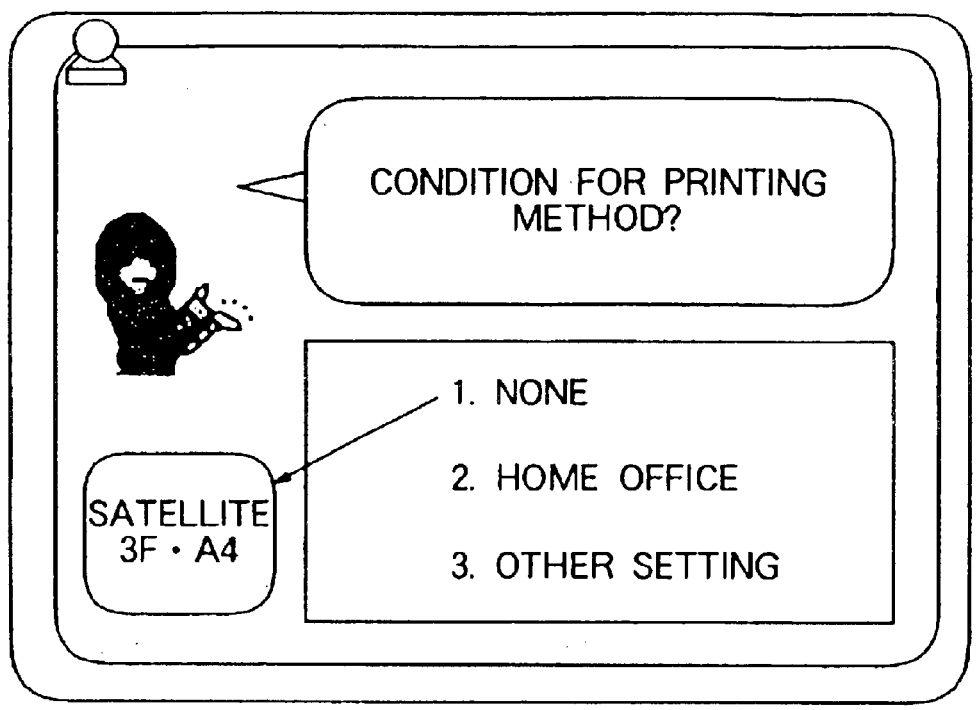
FIG. 16 is a diagram showing a QOS menu of the personal agent.

When the user chooses "Print circular notice 1", the personal agent presents a QOS menu screen for printout (FIG. 16). In this embodiment, the QOS menu includes three selection items, i.e., "None", "Home office", and "Other setting". Prior to displaying the screen image of FIG. 16, the personal agent recognizes according to information from the terminal agent that the user has executed "Login" from the satellite office. Consequently, when the user selects "None" from the QOS menu of FIG. 16, the printing operation is accomplished in the satellite office and "Home office" is additionally presented in the QOS menu. When the user chooses "Home office", the printout is produced in the home office; whereas, when "Other setting" is selected, the printing location and other items are set by the user.

The embodiment shows a case in which the user selects "None".

Figure 17:
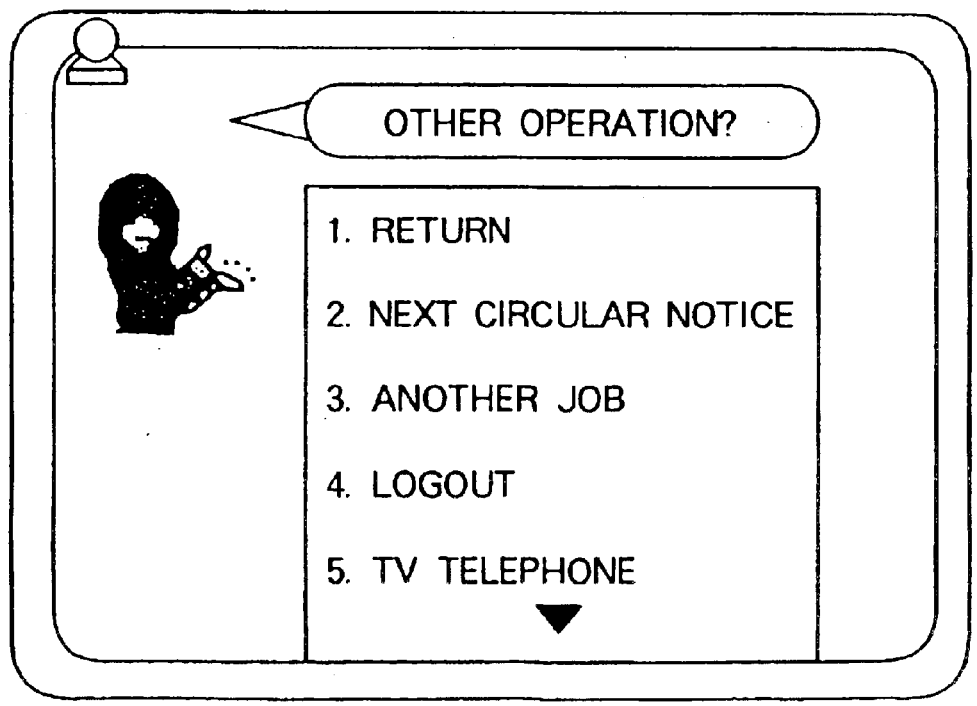
FIG. 17 is a diagram showing a service menu of the personal agent.

In this situation, the printing operation is carried out in the satellite office and the personal agent displays again the service menu screen (FIG. 17) if possible. The screen image of FIG. 17 is basically the same as that of FIG. 15. Only the contents of the service menu vary therebetween because the personal agent has reconstructed the service menu according to the printing operation of the circular document.

According to the user interface of the present invention described above, the agents re-configure the contents of the service menu and/or the QOS menu according to the utilization frequency of the user or operation contents.

The terminal and personal agents in the embodiment above correspond respectively to the terminal agent 113 and personal agent 115 in the embodiment of the computing service described above.

Figure 18:
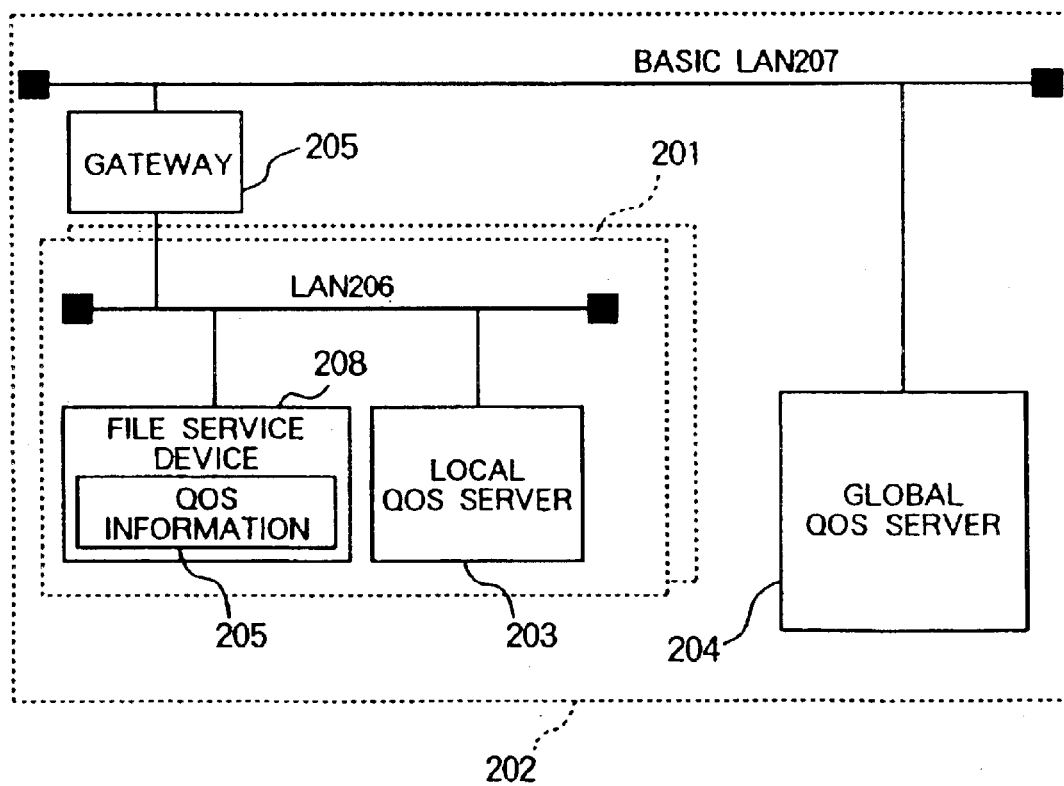
FIG. 18 is a diagram showing an embodiment according of the file service according to the present invention.
Figure 19:
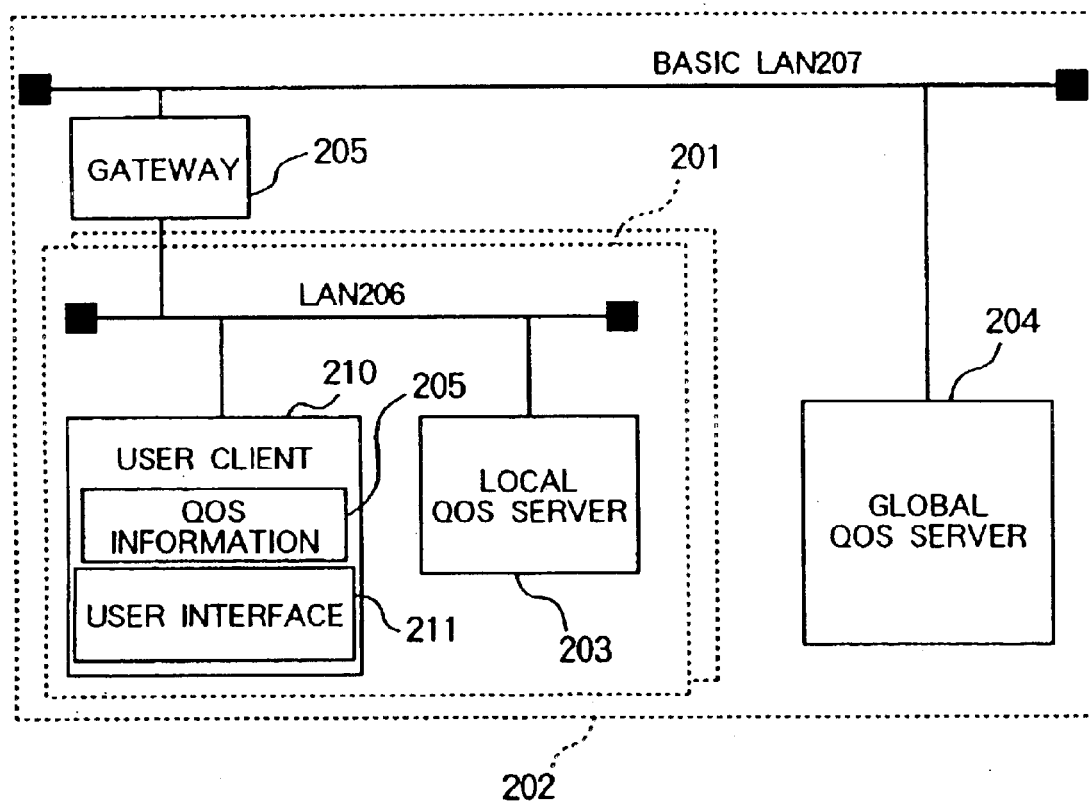
FIG. 19 is a diagram showing a flow of QOS information of the file service.

Referring now to FIGS. 18 and 19, description will be given of an embodiment of the file service according to the present invention. To implement the embodiment of the present invention, there are required two control methods including (1) a method of controlling the user interface of the file service in the computer network and (2) a method of controlling quality of service (QOS) of file service devices linked with the computer network. Since the first control method has already been described in conjunction with the embodiment of the user interface, description will be given in detail of the second control method and information to be passed from the second control method to the first control method in the file service.

First, referring to FIG. 18, description will be given of the QOS control server of the file service devices. The computer network is hierarchically supervised according to the unit of zones and domains. A QOS control server is arranged for each control unit such as the zone or domain. The QOS information 205 of the file service device 208 and an identifiers (ID) to identify the device on the network or a name corresponding thereto are registered to be hierarchically controlled.

In the hierarchic structure including zones and domains of FIG. 18, there are established correspondences between local areas 201 supervised by a lower-layer QOS control server and global areas 202 respectively constituted with a plurality of local areas 201 and controlled by a higher-layer QOS control server. In FIG. 18, the QOS information 205 of each information processing apparatus connected to LAN 206 in the local areas 201 and an identifier of the device or a name corresponding thereto are registered to the local QOS control server 203.

A portion or all of the registration contents of the QOS control server is or are registered to the global QOS control server 204 via the gateway 205 of the global area 202 including the local areas 201 and the basic LAN 207.

Operations of the other sections of FIG. 18 are the same as those of the components of the embodiment of the computing service and hence description thereof will be avoided.

Next, description will be given of the contents of QOS of file service devices.

For QOS of file service devices, there can be considered various levels including classification according to quality of service most close to device characteristics at a lower level and classification closely associated with file characteristics at a higher level. As a favorable embodiment of the present invention, the lower-level and higher-level QOS items are set as follows.

1. Lower-Level QOS Items

Transfer speed (sequential performance), random

I/O performance, access time;

Bit error ratio, mean time to data loss (MTTDL), mean time for data availability (MTDA);

Bit cost.

2. Higher-Level QOS Items

Online storage (ordinary file);

Mobile picture (e.g., resolution of 640×480 in MPEG format, HDTV quality);

Backup storage.

Next, description will be given of the method of registering the file service devices to the QOS control server. According to the present invention, when a file service device is connected to the computer network or to a computer on the network, it is desired to automatically register the device to the QOS control server. For this purpose, it is only necessary that each device keeps the own QOS in a non-volatile storage so as to notify the QOS information to the control server when the device is linked with the network or computer.

When a device to be directly connected to the network is powered or connected to the network, the own QOS is autonomously reported to the control server. For a device to be connected to the computer, when the computer recognizes that the device is coupled therewith, it is only necessary for the computer to read the QOS information of the device so as to register the QOS information to the control server. For the computer to sense the event of connection the device, there may be periodically conducted a polling operation to recognize presence or absence of the device or there may be employed, for example, an input/output bus capable of sensing the event of connection of the device according to the protocol of input/output buses such as power and signal lines. Notification of QOS from the device to the computer can be accomplished as follows. For example, in response to a Mode Sense command from the computer (initiator in the SCSI), the device (target in the SCSI) issues a response.

In FIG. 18, when the file service device 208 is linked with LAN 206, the device 208 reads its own QOS information 209 and notifies the QOS information 209 to the local QOS control server 203. The server 203 registers the QOS information 209 and a portion or all of the QOS information 209 to the global QOS control server 204 on the basic LAN 207.

Subsequently, description will be given of information to be passed from the QOS control server to the user interface.

The information items of file server devices from the QOS control server to the user interface includes the following items.

1. Name or identifier to identify the device on the network
2. QOS at each level The user interface selectively decides according to a level assigned to the user and a request from the user which one of the levels of QOS is to be presented to the user.

In FIG. 19, a QOS control server 210 and a user client 212 are connected to each other via LAN 211. A user interface 213 which is an application system operating on the user client requests via LAN 211 the QOS control server 210 to send thereto QOS information at a level according a user's request. The server 210 sends the requested QOS information. If the pertinent QOS information is missing in the server 210, the request for QOS information is transmitted to another QOS control server at a higher hierarchic level.

Operation of the user interface of FIG. 19 has already been described in detail in conjunction with the embodiments respectively of the user interface and computing service. Consequently, description thereof will be avoided.

Figure 20:
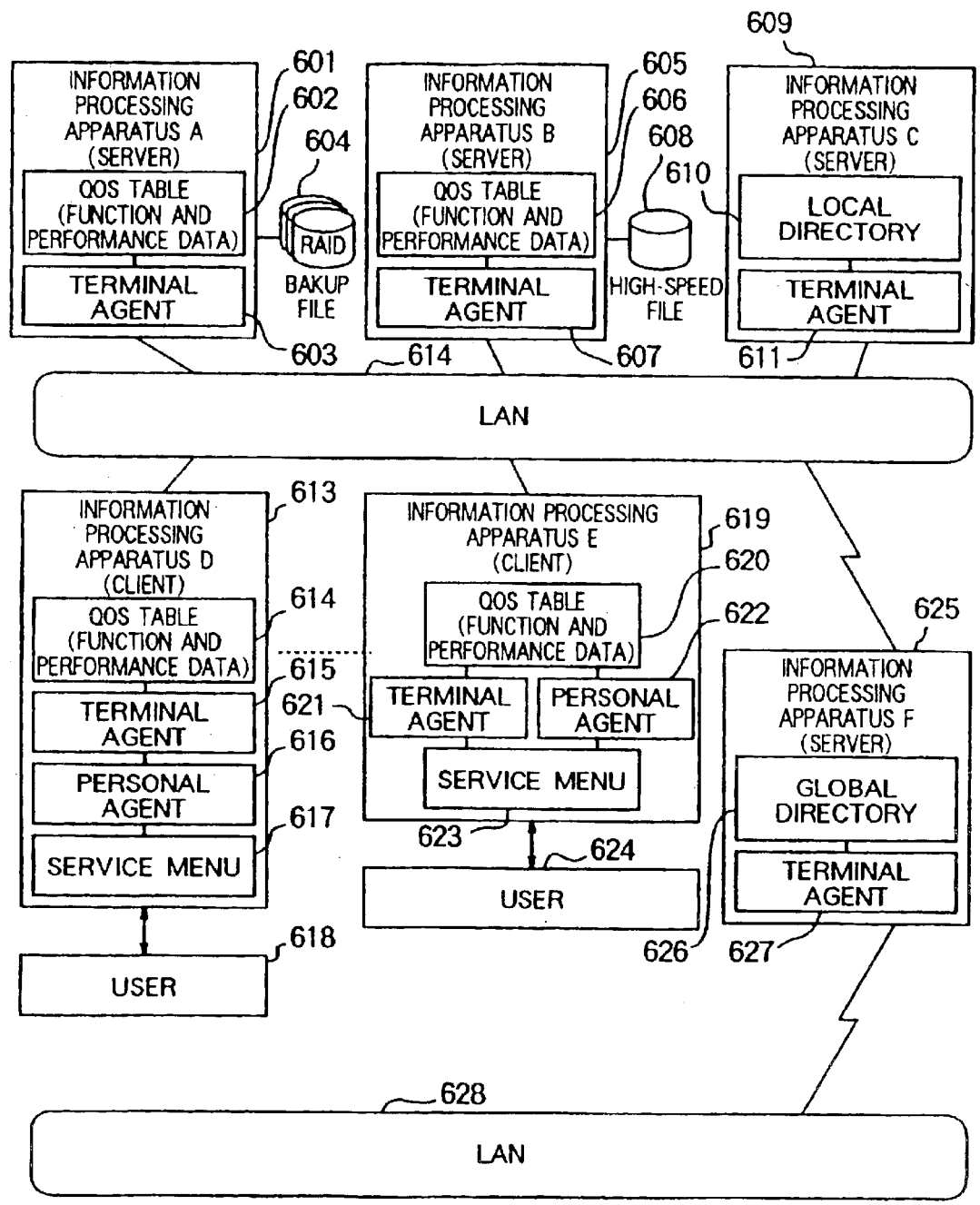
FIG. 20 is a diagram showing the configuration of an embodiment related to a network according to the present invention.

Subsequently, description will be given of an embodiment related to the network. FIG. 20 shows an example of the system configuration of the embodiment. LAN 612 is connected to information processing apparatuses A 601, B 605, C 609, D 613, E 619, and F 625. In this embodiment, the apparatuses A 601, B 605, C 609, and E 625 are servers for mainly providing services, whereas the apparatuses D 613 and E 619 are clients to mainly receive the services. The apparatus A 601 is coupled with a highly reliable disk 604 in the redundant arrays of inexpensive disks (RAID) configuration, whereas the apparatus B 605 is coupled with a disk 608 having a high access speed. The apparatus E 625 is also connected to another LAN 628 and functions as a higher-level server.

Next, operation of the present invention will be described. When powered, the information processing apparatus A 601 linked with LAN 612 executes its initial setting operation to load the operating system or monitor program and then initializes the program so as to set up the terminal agent 603, thereby finally establishing the utilization environment.

During the initial setup operation or initialization of the operating system, there is acquired QOS information of input/output devices connected to the system. For example, when the input/output device is connected via SCSI, an Inquiry command is issued to gather information of functions of the device. For another input/output interface, the QOS information is obtained according to an information collecting method supported by the interface. There may be used such interfaces as RS232C, Centronics, bidirectional Centronics, and GPIB.

The QOS information to be gathered includes values of functions and performance, for example, those of the capacity and transfer performance for disks and those of print speed, print line density, color or monochrome, and print form size.

In case where the connected I/O device does not have any interface providing QOS information, the QOS information is manually set to the file or non-volatile memory from an external device such that the contents thereof are read from the storage when the device is activated, thereby gathering the QOS information. When the connected I/O device supplies only partial information, the remaining necessary information is manually set as above or the system default values are loaded in the file or non-volatile memory. When the information processing apparatus is activated, the stored QOS information is obtained from the storage to thereby gather the QOS information.

The collected QOS information is accumulated in a QOS table 602 of the information processing apparatus. FIG. 21 shows an example of constitution of the QOS table 602.

When the QOS table 602 is completely created for the connected I/O devices, the apparatus A 601 notifies initiation of the own system to the other information processing apparatuses. In this operation, the QOS table 602 of the own system is also transferred. For the transfer of the table 602, there is employed a broadcast address on the network to pass the table 602 to the destinations. On receiving the notification, the apparatus C 609 as a control server in the network having a local directory stores the table 602 in the local directory. The other information processing apparatuses store the received QOS table 602 when necessary. Specifically, the terminal agent of the pertinent apparatus makes a check to decide necessity of the information. If necessary, the information is stored as internal data. The decision is conducted according to a predetermined condition or to whether or not there is contained I/O information.

Subsequently, when information of the QOS table 602 requested in the past includes QOS table information of another information processing apparatus, a terminal agent 603 of the apparatus A 601 issues an inquiry to the apparatus for the QOS table information.

For the inquiry, there is adopted, for example, a method using a broadcast address. The apparatus which has received the inquiry and which is connected to a requested I/O device transfers QOS table information thereof to the inquiry source, namely, the apparatus A 601. When receiving QOS table information from a plurality of apparatuses in response to the inquiry, the apparatus A 601 assigns each QOS table information with priority according to a predetermined criterion. The criterion may be related to positional information such as "QOS information belonging to the same network" and/or to difference in I/O performance. In addition, the criterion for decision is specified, for example, according to the system default value or by the system manager.

Furthermore, the inquiry may be issued to the apparatus C 609 having the local directory. When there is missing a server having a global directory in the network, the QOS table in the local directory 610 of the apparatus C 609 is transmitted to the apparatus A 601. When such a server having the global directory (the apparatus E 625 in this case) is connected to the network, QOS table information of the local directory is delivered to the apparatus E 625 having the global directory when the apparatus is activated. On receiving an inquiry for the QOS table from the apparatus A 601, the apparatus C 609 issues an inquiry to the apparatus E 625 so as to send the QOS table obtained in response thereto from the apparatus E 625 and QOS table information of the local directory to the apparatus A 601. As a result, the necessary QOS table information is transmitted to the apparatus A 601.

As already described in conjunction with the apparatus a 601, the QOS table information can be communicated and created in the similar fashion by an information processing apparatus functioning as a server.

Figure 25:
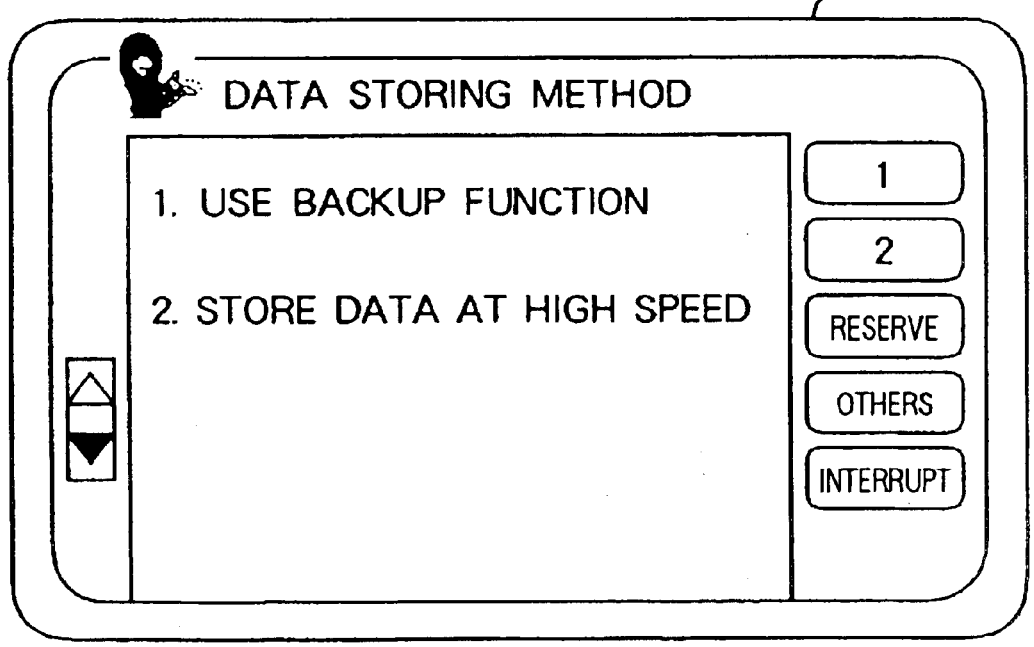
FIG. 25 is a diagram showing an example of the service menu of information processing apparatus D.

Referring next to FIGS. 24 and 25, description will be given of operation of the apparatus D 613 as a client. When the apparatus D 613 is initiated, a terminal agent thereof is already in the activated state. The terminal agent 615 possesses a QOS table 614 and a terminal service information conversion table 629 for conversion of terminal services. An end user 618 invokes a personal agent 616 thereof via the terminal agent 615 to execute the login operation to the apparatus D 613. The activated personal agent 616 has a personal agent service information conversion table 630 and user environment information 631 and displays a service menu 617 according to the user environment information 631. FIGS. 22 and 23 show structure of the service information conversion table and constitution of the user environment information table. FIG. 25 shows an example of the presented service menu. FIG. 25 is a data storing menu in which the RAID of the apparatus A 601 is indicated as a file with backup function and the high-speed disk of the apparatus B 605 is denotes as a storage capable of storing therein data in a short period of time. When the user conducts an operation according to indications of the service menu 617 and there is resultantly required an I/O access, the personal agent 616 performs a retrieval operation through the service information conversion table 630 to execute an I/O access if there exists necessary information. If such information is missing, the personal agent 616 requests the terminal agent 615 to effect retrieval through the terminal service information conversion table 629. If the requested information has already been registered, the terminal agent 615 returns the terminal service information conversion table 629 to the personal agent 616 as the request source. If the requested information is missing, the terminal agent 615 carries out an operation similar to that of the inquiry to acquire the necessary QOS table information. According to the obtained QOS table information, the terminal agent 615 updates the table 629 and then returns the updated table 629 to the personal agent 616. As a result of above operations, there is configured a service access environment for the end user 618 in the apparatus D 613.

Figure 26:
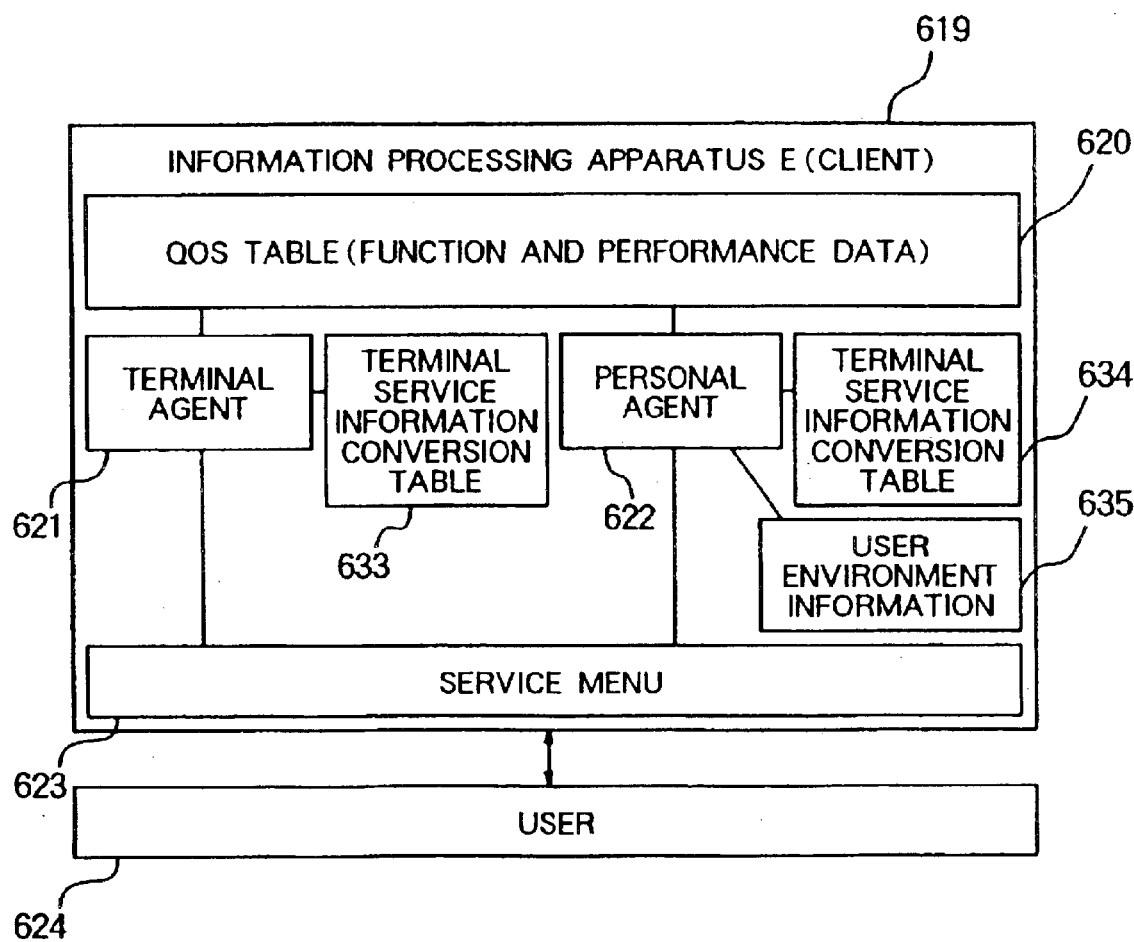
FIG. 26 is a diagram showing details of information processing apparatus E.
Figure 27:
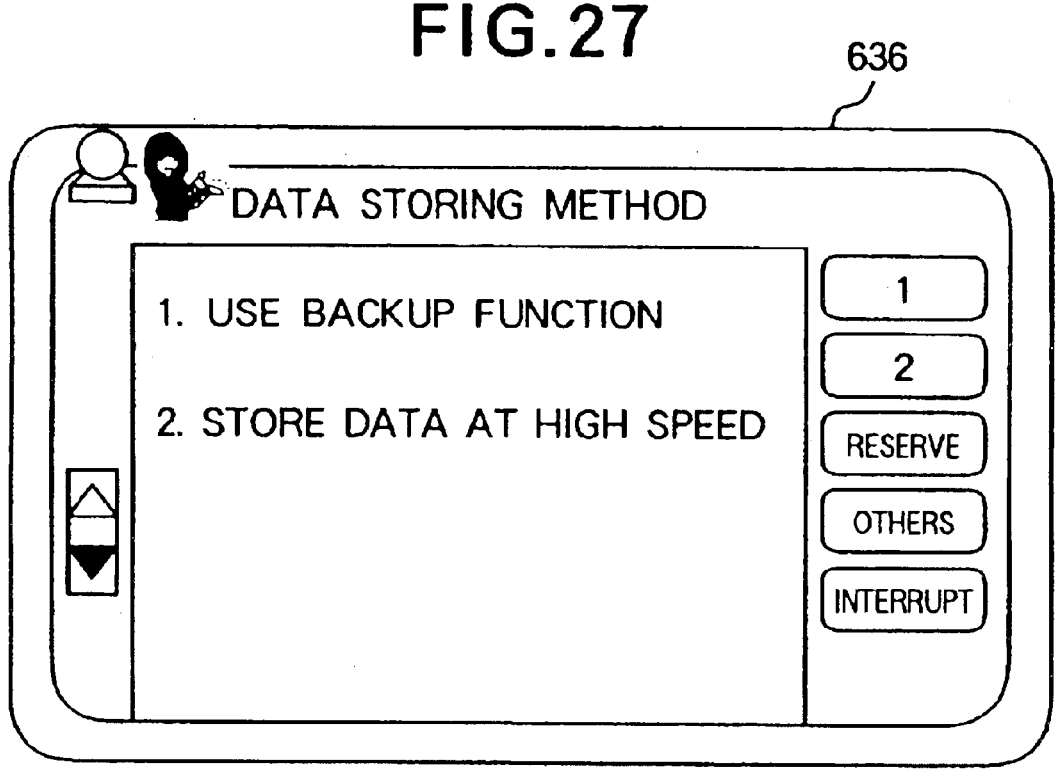
FIG. 27 is a diagram showing an example of the service menu of information processing apparatus E.

Next, referring to FIGS. 26 and 27, description will be given of operation of the client apparatus E 619. The apparatus E 619 differs from the apparatus D 613 in that a terminal agent 621 and a personal agent 622 are connected in a parallel fashion to each other. This allows an end user 624 to achieve a change-over operation between the agent when necessary. When the apparatus E 619 is activated, the terminal agent 621 is in the invoked state. The terminal agent 621 has a QOS table 620 and a terminal service information conversion table 633 for achieving conversion of terminal services. The end user 624 initiates a personal agent 622 thereof via the terminal agent 621 to conduct a login operation to the apparatus 619. As a result of the login, the processing object is changed over from the terminal agent 621 to the personal agent 622. Like the apparatus D 613, the personal agent 622 has a personal agent service information conversion table 634 and user environment information 635 to display a service menu 623 according to the user environment information 635. FIG. 27 shows an example of the presented service menu 623, which is used to store data. In the menu, the RAID 604 of the apparatus A 601 is designated as a highly reliable file with backup function and the high-speed disk of the apparatus B 605 is indicates as a storage in which data can be stored in a short period of time. In the service menu 636, the terminal and personal agents are graphically shown in the upper-left corner of the screen. This means that the agents are ready for service requests. When an I/O access is required in response to a user's action in the service menu 623, the personal agent 622 executes retrieval through the personal agent service information control table 634 to conduct an I/O access when necessary information is detected. If such necessary information is missing, the personal agent 622 requests the apparatus C 609 to accomplish retrieval through the terminal service information control table 633. If the requested information has already been registered, the terminal agent 622 of the apparatus C 609 returns the conversion table 633 to the personal agent 622 as the request source. If the information is missing, the terminal agent 611 executes operation similar to that of the inquiry to finally acquire the necessary QOS table information. The terminal agent 611 updates the conversion table 633 of the apparatus E 619 according to the attained QOS table information and then returns information of the terminal service information conversion table 634 to the personal agent 622. Thanks to the operation above, a service access environment is prepared for the end user 624 in the apparatus E 619.

In FIGS. 25 and 27, the service selection is implemented in the menu format. However, the disk which provides services may be visualized as an icon in the screen in the same manner as for presentation of the terminal and personal agents.

Figure 28:
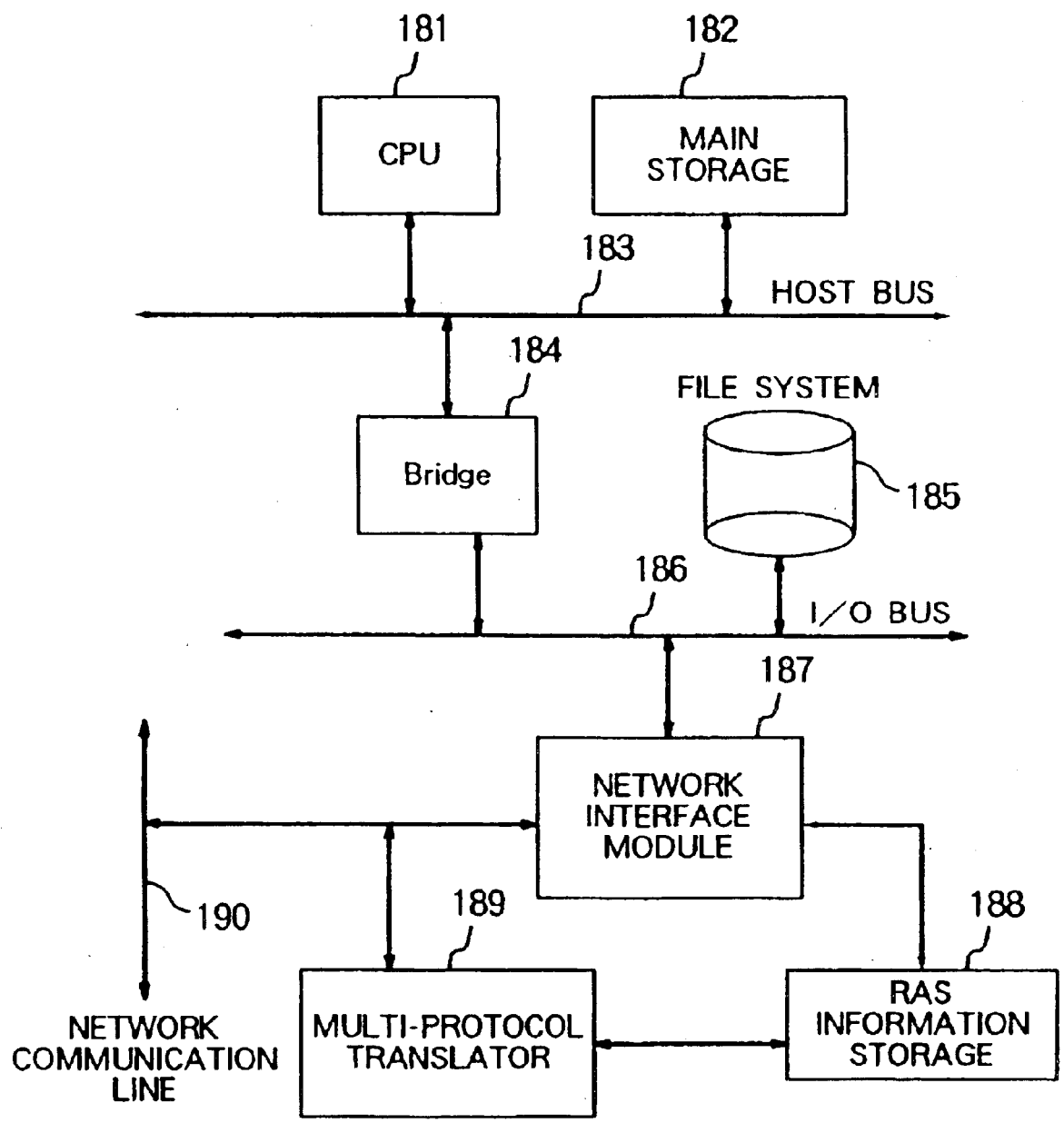
FIG. 28 is a block diagram showing an example of service of reliability, availability, and security (RAS) information.

FIG. 28 shows an outline of constitution of an embodiment of the present invention.

In the embodiment, service information includes information related to functions of reliability, availability, and security (RAS) of information processing apparatuses.

In FIG. 28, a reference numeral 181 stands for a CPU, a numeral 182 denotes a main storage, a numeral 183 indicates a host bus, a numeral 184 represents a bridge for achieving transformation between the host bus 183 and an I/O bus 186, a numeral 187 indicates a network interface module connected to the I/O bus 186 for achieving conversion of data to and from a network line 190, and a numeral 188 designates an RAS information storage for keeping therein such information related to system reliability (to be referred to as RAS information herebelow) as information associated with power (whether or not power is daily supplied 24 hours, whether or not a backup power supply is arranged, and whether or not the power supply is structured in the duplex configuration), information related to the file system (whether or not the file system is duplicated, whether or not the file system includes a disk array configuration, and the kind of file system, representatively, NFS), and information of other system devices (presence or absence of functions to monitor failures, to detect failures, to notify failures, and to restore failures; or functions supported by the system). Moreover, in FIG. 28, a numeral 189 represents a multi-protocol translator for observing signals on the network line 190 and for reading, when a signal or message requesting information of reliability is sensed, necessary information from the RAS information storage 188 independently of the system processing and state, thereby sending the information to the network line 190.

In the embodiment of FIG. 28, it is assumed that Ethernet to transfer information conforming to three communication protocols TCP/IP, IPX/SPX, and Apple Talk is installed on the network line 190 and the multi-protocol translator 189 can cope with these protocols.

Figure 29:
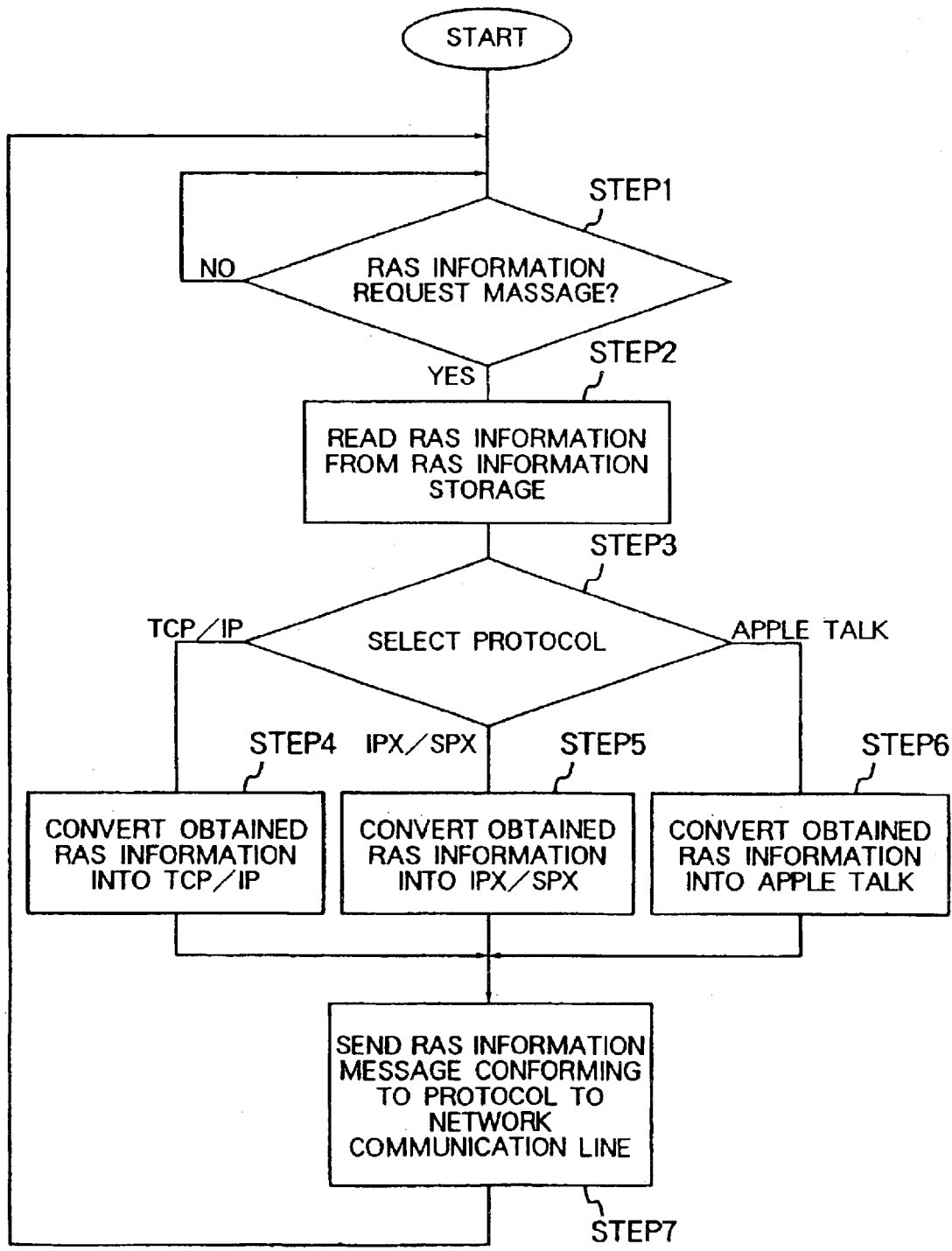
FIG. 29 is a flowchart showing a flow of transmission of RAS information.

FIG. 29 shows a processing flow of the translator 189 in FIG. 28. The translator 189 of FIG. 28 observes signals on the network communication line 190. When a signal requesting RAS information conforming to either one of STEPI, TCP/IP, IPX/SPX, and Apple Talk, control is passed to step 2 to read RAS information from the RAS information storage 188. Processing is then transferred from step 2 to step 3 in which control is passed to step 4, 5, or 6 according to the communication protocol of the signal sensed in step 1.

When the communication protocol is TCP/IP in step 1, processing proceeds to step 4 to convert the attained RAS information according to the TCP/IP protocol. Similarly, when the communication protocol is IPX/SPX in step 1, control is transferred to step 5 to transform the RAS information according to the IPX/SPX protocol. Furthermore, when the communication protocol is Apple Talk in step 1, control is passed to step 6 to convert the RAS information according to the Apple Talk protocol. When the step 4, 5, or 6 is completed, control is transferred to step 7 to transmits the RAS information conforming to the pertinent communication protocol to the network.

Figure 30:
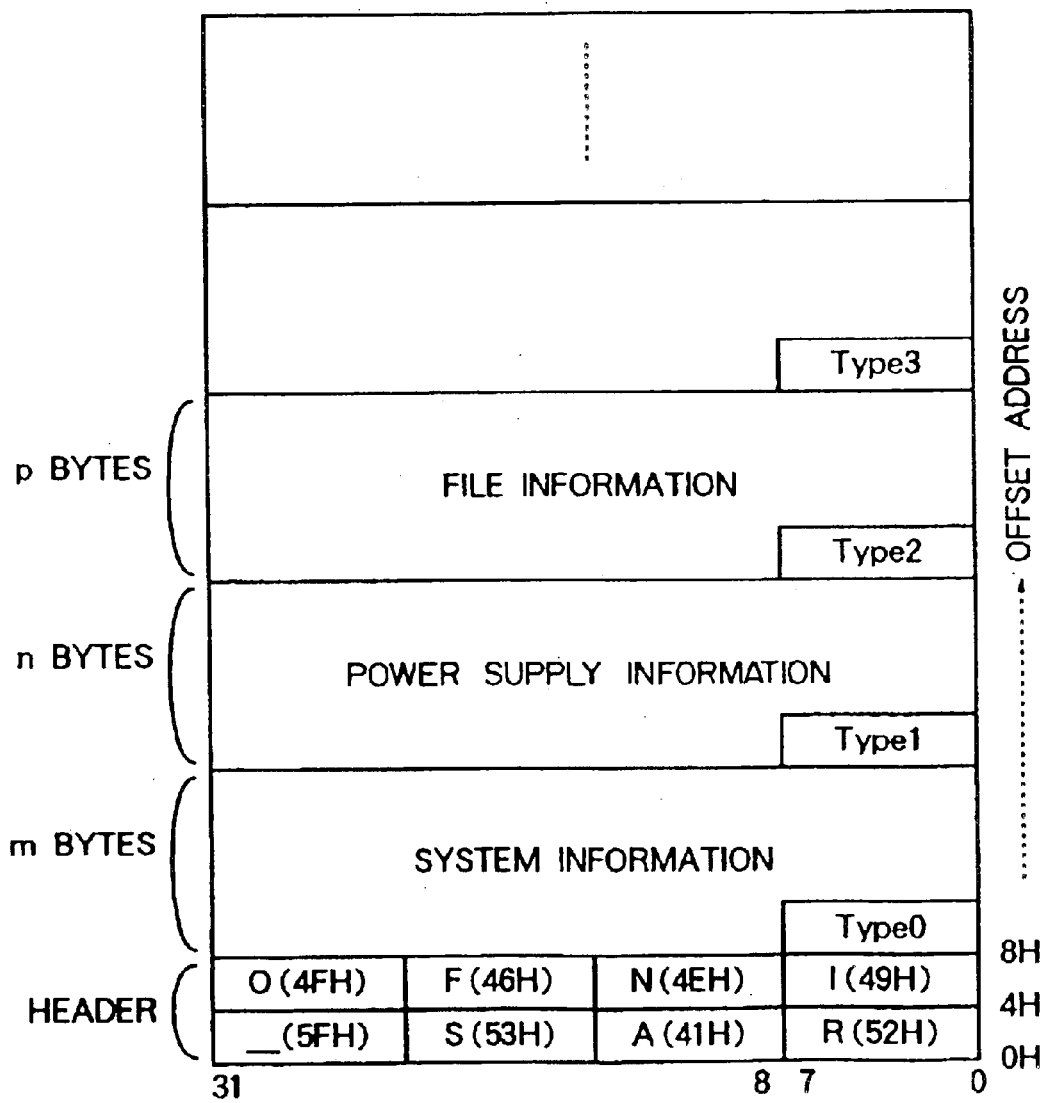
FIG. 30 is a diagram showing the format of RAS information.

After step 7 is processed, control is passed to step 1 to repeatedly accomplish the above processing flow. FIG. 30 shows an example of the data format of RAS information data kept in the RAS information storage of FIG. 28. In FIG. 30, the first eight-byte field beginning at the offset address OH is loaded with header data of RAS information, namely, character codes "RAS INFO". In the subsequent bytes, there is stored RAS information of the system such as information indicating whether or not the system has the functions to monitor failures, to detect failures, to report failures, or to restore failures or information denoting functions of the system.

Written in the first byte of the data area is a code designating the type of RAS information (type 0 denoting system information is written in this example). In the next n-byte field, there are stored information indicating whether or not the system is daily powered 24 hours, information designating whether or not a backup power supply is disposed, information indicating whether or not the power source is duplicated, and the like.

Similarly, written in the first byte of the data area is a code representing the type of RAS information (type 1 denoting power information is stored in this example). In the subsequent p bytes, there are stored information related to the file system, for example, information designating whether or not the file is duplicated, information indicating whether or not there is employed the disk array configuration, and information denoting the type of the file system (representatively, NFS). Analogously, stored in the first byte of the data area is a code representing the type of RAS information (type 2 denoting file information is written in this example).

According to the embodiment above, when a request for information of reliability is issued from an information processing apparatus or the like on the network, there can be transmitted RAS information of the system regardless of the operation state of the terminal.

The multi-protocol translator 189 of the embodiment may be controlled by the DCE support 156 and network I/F 155 of FIG. 8.

As can be appreciated from the above description, information related to functions and performance of information processing facilities connected to each other via a network is converted into service information to be supplied to the users. This leads to an advantage that the user can much more directly receive the services.

Since service information is delivered to the users via the agents, the users need only establish interfaces with the agents. It is not necessary for the users to pay attention to constitution of the apparatuses connected to the network.

Moreover, since the services common to the respective users are supplied by the terminal agent, the contents of the services delivered to the users can be altered at once by modifying the functions of the terminal agent.

The personal agent changes the contents of service informations to be supplied via the user interface according to the utilization mode of each user such as the user's operation procedure or the utilization frequency of a particular service. Consequently, there can be provided a user interface optimal to each user.

Since the agents convert information of functions and performance of the apparatuses on the network into service information for the users according to the contents registered to the service information control table, the contents of service information supplied to the users can be varied by modifying the contents of the service information conversion table. Namely, for this purpose, it is unnecessary to change the contents of the QOS table of each apparatus.

According to the present invention, also when a new information processing apparatus is connected to the network, information of functions and performance of the apparatus is automatically registered to the system. Consequently, the user can attain information of services without considering the configuration of the apparatus connected to the network and the change in constitution thereof.

Since a broadcast communication is adopted as means to register the information of functions and performance to the information system, even when a new apparatus is connected to the network, the information of functions and performance can be registered independently of the constitution of the network.

According to the present invention, for an apparatus not having a QOS table, a predetermined benchmark test is executed to create a QOS table according to a result of the test. Consequently, information of functions and performance of the apparatus can be effectively registered to the system regardless of presence and absence of the QOS table.

Moreover, through an operation in which the contents of the benchmark test are altered to execute the test in each apparatus on the network so as to register a result of the test to the QOS table, the QOS criterion of the system is changed and hence the contents of service information are also modified for the users.

Thanks to an operation in which a benchmark test prepared by the user is supplied to the system to execute the test for each apparatus to register a result of the test to the service information conversion table, information of functions and performance of an arbitrary items of each apparatus of the system can be advantageously added as service information to the system.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A network system comprising:

one or plurality of storage apparatuses each of which is coupled to a disk device; and a computer coupled to each of said one or plurality of storage apparatuses;

wherein said computer, has first quality of service (QoS) information of at least one of said one or plurality of storage apparatuses, translates the first quality of service information which is a lower level QoS information such as information on performance of said one plurality of storage apparatuses into second quality of service information which is higher-level QoS information such as information of the properties of a file for a user and outputs the second quality of service information when said computer receives a request.

2. A network system of claim 1, wherein first said quality of service information includes capacity of storage area or data transfer performance of storage apparatus.

3. A network system of claim 2, wherein at least one of said one or plurality of storage apparatuses sends the first quality of service information of its own storage apparatus to said computer, and said computer stores the received first quality of service information.

4. A network system of claim 3, wherein said one of said one or plurality of storage apparatuses is coupled to a disk device via SCSI interface, and gets the first quality of service information of said disk device using inquiry command.

5. A network system of claim 4, wherein each of said one or plurality of storage apparatuses is coupled to a disk device via SCSI interface.

6. A network system of claim 6, wherein said one or plurality of storage apparatuses are coupled to a plurality of disk devices having RAID configuration.

7. An information processing apparatus comprising:

a processor:

a storage device; and a network interface for coupling to one or plurality of storage apparatuses each of which coupled to a disk device;

wherein said processor receives first quality of service information which includes performance or function information of said one or plurality of storage apparatuses via said network interface, stores said first quality of service information into said storage device, converts said first quality of service information which is a lower level QoS information such as information on performance of said one plurality of storage apparatuses into second quality of service information which is higher-level QoS information such as information of the properties of a file is used by a user, and outputs said second quality of service information when said information processing apparatus receives a request.

8. An information processing apparatus of claim 7, wherein said performance or function information includes information about capacity of disk device or data transfer performance of storage apparatus.

9. An information processing apparatus of claim 8, wherein said processor further stores third quality of service information indicating the performance of said information processing apparatus into said storage device.

10. An information processing apparatus of claim 9, wherein said information processing apparatus receives said first quality of service information from said one or plurality of storage apparatuses, and stores received first quality of service information into said storage device.

11. An information processing apparatus of claim 10, wherein said information processing apparatus receives the first quality of service information when a new storage apparatus is coupled to said information processing apparatus via said network interface.

* * * * *